United States Patent
Takahashi et al.

(12) 
(10) Patent No.: US 6,250,681 B1
(45) Date of Patent: *Jun. 26, 2001

(54) SHOULDER ANCHOR DEVICE

(75) Inventors: Kazunori Takahashi; Chiharu Igarashi; Osamu Tokugawa, all of Kanagawa (JP)

(73) Assignee: NSK Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/118,070

(22) Filed: Jul. 17, 1998

(30) Foreign Application Priority Data

Jul. 18, 1997 (JP) .................................. 9-194484
Aug. 14, 1997 (JP) .................................. 9-219553

(51) Int. Cl.⁷ ................................................ B60R 22/28
(52) U.S. Cl. ...................... 280/805; 280/801.2; 280/808; 297/471
(58) Field of Search ................... 280/801.1, 801.2, 280/808, 805; 297/468, 483, 471; 248/300, 231.9, 503

(56) References Cited

U.S. PATENT DOCUMENTS

| | | | | |
|---|---|---|---|---|
| Re. 31,106 | * | 12/1982 | Pufpaff et al. | 403/353 |
| 4,165,944 | * | 8/1979 | Sunasky | 403/254 |
| 4,630,982 | * | 12/1986 | Fenner | 410/102 |
| 4,729,581 | * | 3/1988 | Ono | 280/808 |
| 4,840,405 | * | 6/1989 | Escaravage | 280/808 |
| 4,867,477 | * | 9/1989 | Escaravage | 280/808 |
| 4,871,192 | * | 10/1989 | Escaravage et al. | 280/808 |
| 4,938,914 | * | 7/1990 | Escaravage et al. | 280/808 |
| 4,949,994 | * | 8/1990 | Zawisa | 280/802 |
| 5,149,136 | * | 9/1992 | Maekawa et al. | 280/808 |
| 5,529,344 | | 6/1996 | Yasui et al. | |
| 5,603,594 | * | 2/1997 | Lincoln | 411/84 |
| 5,791,687 | * | 8/1998 | Gotou et al. | 280/805 |
| 5,906,396 | * | 5/1999 | Biller | 280/801.2 |

FOREIGN PATENT DOCUMENTS

| | | | | |
|---|---|---|---|---|
| 59-29537 | * | 8/1982 | (JP) | B60R/21/10 |
| 63-297143 | * | 5/1987 | (JP) | B60R/22/20 |
| 4-113959 | * | 9/1990 | (JP) | B60R/22/20 |
| 4-113960 | * | 9/1990 | (JP) | B60R/22/20 |

* cited by examiner

*Primary Examiner*—Brian L. Johnson
*Assistant Examiner*—Joselynn Y. Sliteris
(74) *Attorney, Agent, or Firm*—Evenson, McKeown, Edwards & Lenahan, P.L.L.C

(57) ABSTRACT

A shoulder anchor device comprises a through anchor (23) for supporting a seat belt, a base member (3, 103) for mounting on a center pillar of a vehicle body, and a fixing mechanism (38, 40) for fixing the through anchor to the base member. The base member includes a channel-shaped anchor fixing portion (1) of a generally C-shaped cross-section for fixing the through anchor, and a pair of vehicle fixing portions formed integrally at opposite ends of the anchor fixing portion and formed into a generally flat plate-shape in a cross-section.

32 Claims, 21 Drawing Sheets

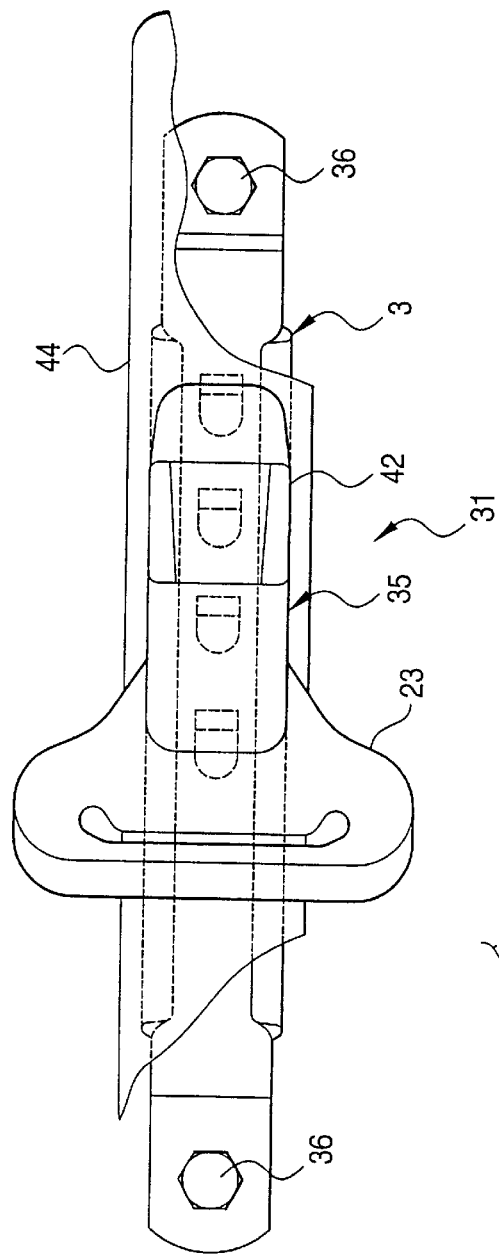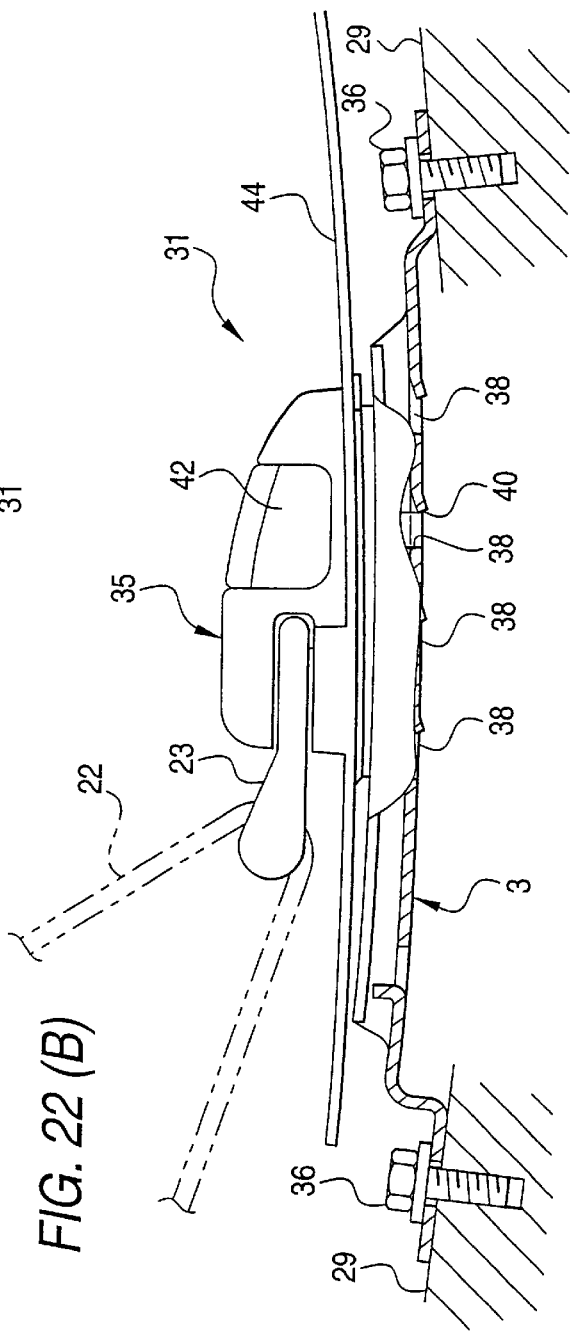
FIG. 22 (A)
FIG. 22 (B)

SHOULDER ANCHOR DEVICE

BACKGROUND OF THE INVENTION

This invention relates to a seat belt device in an automobile, and more particularly to an adjustable shoulder anchor device which is mounted on a center pillar, and fixes a shoulder belt anchor.

One known example of a conventional seat belt devices for safely holding a passenger or the like within a vehicle on a seat is a three-point seat belt device using a continuous webbing.

In a seat belt device of this kind, as shown in FIG. 23, one end portion of a webbing 22 is retained by a retractor (take-up device) 27, and the other end is passed through a through anchor 23, and is retained by an anchor plate 28 pivotally mounted on a lower end portion of a center pillar 29. A through tongue 24 is mounted on the webbing intermediate the anchor plate 28 and the through anchor 23, and by engaging this through tongue 24 in a buckle 25 mounted upright at a generally central portion of a vehicle, the passenger can be held on a seat 30.

In order that the effective length of the webbing 22 is adjusted in accordance with the body physique/constitution of the passenger and that the webbing 22 is accurately put on the shoulder of the passenger, such a three-point seat belt device further employs an adjustable shoulder anchor device 31 for allowing the through anchor 23 (mounted on the center pillar 29) to move upward and downward so as to adjust the height of support of the shoulder belt.

In an adjustable shoulder anchor device (hereinafter referred to as "anchor device") of a seat belt device in an automobile, the height of support of the shoulder belt is adjusted in accordance with the body build and so on of the passenger.

When the automobile collides, an impact load and a tensile load are applied to the through anchor and an adjustable base fixing this through anchor in such a manner that the position of the through anchor can be adjusted.

In order to protect the passenger striking against the anchor device, for example, in a side collision of the automobile, the anchor device has heretofore been required to be easily deformed upon application of an impact load. The anchor device has also been required to well withstand a tensile load so that the ability of the seat belt to hold the passenger can be enhanced.

The conventional adjustable bases are classified into a channel type and a flat plate type.

The channel-type adjustable base has a channel-shaped (i.e., generally C-shaped) cross-section throughout the length thereof from one end to the other end, and fixing portions (fixedly secured to the center pillar), provided respectively at the opposite ends of this adjustable base, have also a channel-shape. The channel-type adjustable base is high in rigidity, and therefore has a high strength against both of an impact load and a tensile load. Since the adjustable base has a high strength against a tensile load, it is less liable to be deformed under a tensile load, for example, upon collision of an automobile, and therefore this enhances the ability of holding the passenger. However, since the adjustable base has a high strength against an impact load means that its ability to cushion an impact load is low, and therefore when part of the passenger's body strikes against the anchor device, an impact, applied to the passenger, tends to be large.

The flat plate-type adjustable base is flat as a whole although fixing portions, provided respectively at opposite ends thereof, are slightly bent, and a shoulder belt anchor is fixedly secured to a central portion of this adjustable base. This flat plate-type adjustable base is lower in rigidity than the channel-type adjustable base, and therefore has a problem that it has a lower strength against both of an impact load and a tensile load as compared with the channel-type adjustable base. Since the adjustable base has a low strength against an impact load and a tensile load, it has a high ability of cushioning an impact load, and therefore can reduce an impact to be applied to the passenger. However, since this adjustable base also has a low strength against a tensile load, it can be easily deformed under a tensile load, which results in a possibility that the ability of holding the passenger is lower as compared with the channel-type adjustable base.

A conventional rail member can be buckled or deformed by an impact load, produced when the passenger strikes against an adjustable shoulder anchor device, for example, in a side collision of an automobile, and absorbs its energy, thereby securing the safety of the passenger.

Thus, upon application of an impact load, the rail member is buckled, bent or deformed at buckling portions to absorb the impact load. However, if an energy of a reaction force, tending to restore the rail member, is accumulated when the rail member absorbs the impact force, it is thought that an impact can be applied to the passenger when the rail member is restored under the influence of the reaction force.

Incidentally, U.S. Pat. No. 5,529,344 entitled "SEAT BELT DEVICE FOR AUTOMOBILE" discloses a conventional technique in which a slot is formed in each fixing portion of a rail member, and a bolt is passed through the slot, and is threaded into a center pillar, thereby fixing the rail member.

In this device, however, upon application of an impact load, an impact is absorbed in an amount corresponding to the amount of movement of the rail member along the slot, but after the rail member fully moves along the slot, so that the bolt abuts against an end of the slot, a reaction force energy, tending to restore the rail member, is accumulated. And besides, upon application (inputting) of a tensile load, the rail member is deformed in an amount corresponding to the length of the slot, and if the slot is so increased in size that the reaction force energy will not be accumulated, the amount of deformation is further increased.

As described above, the conventional anchor device, having the channel-type adjustable base, has a high strength against an impact load, but has a problem that its ability of cushioning the impact load is low, and the anchor device, having the flat plate-type adjustable base, has the high ability of cushioning an impact load, but has a problem that it has a low strength against a tensile load, and is liable to be deformed.

In addition, the conventional rail member is deformed upon application of an impact load thereto, and absorbs the impact load. However, if the energy of the reaction force, tending to restore the rail member, is accumulated, the impact due to this reaction force, which is applied to the passenger, becomes a problem. In the construction disclosed in the U.S. Pat. No. 5,529,344, the reaction force is liable to be accumulated, and the deformation amount is large when a tensile load is inputted. If the slot is increased in size so as not to accumulate the reaction force energy, the deformation amount is further increased.

SUMMARY OF THE INVENTION

The present invention has been made in view of the above problems, and an object of the invention is to provide an adjustable shoulder anchor device which has a high strength against a tensile load applied through a seat belt, and is less deformed, and can sufficiently withstand the tensile load so as to enhance the ability of holding the passenger, and also allows an adjustable base to be deformed to a certain degree upon application of an impact load so as to cushion an impact, thereby enhancing the safety of the passenger, so that this anchor device has the two mutually-contradictory abilities, that is, the increased strength against the tensile load and the enhanced ability of cushioning the impact load.

Further, the present invention has also been made in view of the above problems, and another object of the invention is to provide a shoulder anchor device in which when a rail member is buckled or deformed upon application of an impact load, the rail member is allowed to be displaced outwardly of bolts in an amount corresponding to this deformation, thereby enabling the rail member to be smoothly deformed, and a reaction force, produced when the rail member absorbs the impact, is reduced as much as possible, thereby efficiently absorbing the energy, and on the other hand, when a tensile load is inputted to the shoulder anchor device, the amount of deformation of the rail member is reduced as much as possible, thereby enhancing the ability of holding the passenger at the time of collision of an automobile.

The above-mentioned object can be attained by a shoulder anchor device, according to the present invention, comprising:

a through anchor for supporting a seat belt;

a base member for mounting on a center pillar of a vehicle body; and a fixing mechanism for fixing the through anchor to the base member;

wherein the base member includes, a channel-shaped anchor fixing portion of a generally C-shaped cross-section for fixing the through anchor, and a pair of vehicle fixing portions formed integrally at opposite ends of the anchor fixing portion and formed into a generally flat plate-shape in a cross-section.

In this construction of the invention, when an impact load is applied from the passenger to the anchor fixing portion, the anchor fixing portion is flexed toward the vehicle body, and also the vehicle fixing portions, the interconnecting portions each interconnecting the vehicle fixing portion and the anchor fixing portion, and so on are buckled, thereby cushioning the impact load. On the other hand, when a tensile load is applied by the seat belt, the anchor fixing portion sufficiently withstands the tensile load since it has a channel-shape, and the amount of deformation thereof is small, so that the passenger is held safely.

In the above-mentioned construction of the shoulder anchor device, advantageously, a curved portion is formed at each interconnecting portion of the base member which is interposed between the anchor fixing portion and the associated vehicle fixing portion for interconnecting the same.

In the above-mentioned construction of the shoulder anchor device, advantageously, at least one of the vehicle fixing portions comprises:

a leg portion bent toward the vehicle body relative to the anchor fixing portion; and a mounting portion which is bent relative to the leg portion and extends to a distal end of the base member.

In the above-mentioned construction of the shoulder anchor device, advantageously, the vehicle fixing portion has an extension portion extending between the leg portion and the anchor fixing portion.

In the above-mentioned construction of the shoulder anchor device, advantageously, each of the vehicle fixing portions has the leg portion and the extension portion.

In the above-mentioned construction of the shoulder anchor device, advantageously, one of the extension portions is different in length from the other.

In the above-mentioned construction of the shoulder anchor device, advantageously, the extension portion and a bottom plate portion of the anchor fixing portion are disposed in a common plane in continuous relation to each other.

In the above-mentioned construction of the shoulder anchor device, advantageously, a bending angle b defined between the extension portion and the leg portion of one of the vehicle fixing portions is different from a bending angle e defined between the extension portion and the leg portion of the other vehicle fixing portion.

In the above-mentioned construction of the shoulder anchor device, advantageously, the leg portion of one of the vehicle fixing portions is different in length from the leg portion of the other vehicle fixing portion.

In the above-mentioned construction of the shoulder anchor device, advantageously, the pair of vehicle fixing portions and a bottom plate portion of the anchor fixing portion are disposed in a common plane in continuous relation to one another.

In the above-mentioned construction of the shoulder anchor device, advantageously, a through hole for passing a mounting bolt therethrough is formed through each of the vehicle fixing portions.

In the above-mentioned construction of the shoulder anchor device, advantageously, one of the two vehicle fixing portions is formed into a hook-like shape, and is engageable in an engagement portion of the center pillar.

In the above-mentioned construction of the shoulder anchor device, advantageously, at least one of the vehicle fixing portions has a plurality of mounting portions, and the base member is mounted on the center pillar through the plurality of mounting portions.

In the above-mentioned construction of the shoulder anchor device, advantageously, in which at least one of the vehicle fixing portions has a portion which is bent into a generally Z-shape in a cross-section.

In the above-mentioned construction of the shoulder anchor device, advantageously, at least one of the vehicle fixing portions has a portion which is outwardly bent into a recumbent V-shape in a cross-section.

In the above-mentioned construction of the shoulder anchor device, advantageously, each of the vehicle fixing portions has a leg portion, bent relative to the anchor fixing portion toward the vehicle body, and a mounting portion which is bent relative to the leg portion, and extends to a distal end of the base member.

In the above-mentioned construction of the shoulder anchor device, advantageously, a bending angle between the anchor fixing portion and the leg portion of one of the vehicle fixing portions is different from a bending angle between the anchor fixing portion and the leg portion of the other vehicle fixing portion.

In the above-mentioned construction of the shoulder anchor device, advantageously, a length the leg portion of one of the vehicle fixing portions is different from that of the leg portion of the other vehicle fixing portion.

In the above-mentioned construction of the shoulder anchor device, advantageously, a through hole for passing a mounting bolt therethrough is formed through each of the mounting portions.

In the above-mentioned construction of the shoulder anchor device, advantageously, a slot for receiving a mounting bolt is formed through the mounting portion, and a space is formed between one end of the slot, disposed close to the anchor fixing portion, and the mounting bolt.

In addition, the above-mentioned another object can be achieved by a shoulder anchor device, according to the present invention, comprising:

a through anchor for supporting a seat belt;

a base member for mounting on a center pillar of a vehicle body; and a fixing mechanism for fixing the through anchor to the base member;

wherein the base member includes an anchor fixing portion for fixing the through anchor, and two vehicle fixing portions formed integrally respectively at opposite ends of the anchor fixing portion;

wherein at least one of the vehicle fixing portions includes a mounting portion for mounting on the vehicle body, and an interconnecting portion interconnecting the mounting portion and the anchor fixing portion in such a manner that the anchor fixing portion is disposed inwardly of the mounting portion relative to a vehicle room; and wherein a slot for receiving a mounting bolt is formed through the mounting portion, and extends in a direction of a length of the base member, and a space is formed between one end of the slot, disposed close to the anchor fixing portion, and the mounting bolt.

When a tensile load is applied from the passenger to a rail member, for example, at the time of an automobile collision, each mounting bolt is brought into engagement with the outer end of the associated slot, and the amount of deformation of the rail member is small, and the rail member exhibits a high strength as in the conventional construction. When an impact load is applied from the passenger, the rail member is buckled at buckling portions thereof, and flexed and deformed as in the conventional construction. At this time, each vehicle fixing portion of the rail member is displaced outwardly in the direction of the length of the slot, so that the amount of deformation of the rail member is released outwardly, thereby absorbing a reaction force of the impact load, and therefore the rail member will not accumulate the reaction force to be applied to the passenger.

In the above-mentioned construction of the shoulder anchor device, advantageously, at least one of the vehicle fixing portions has a leg portion, which is bent toward the vehicle body relative to the anchor fixing portion, and the mounting portion which is bent relative to the leg portion, and extends to a distal end of the base member.

In the above-mentioned construction of the shoulder anchor device, advantageously, a central portion of the slot in a direction of a length thereof is constricted.

In the above-mentioned construction of the shoulder anchor device, advantageously, a wavy washer is provided between the mounting bolt and the vehicle fixing portion.

In the above-mentioned construction of the shoulder anchor device, advantageously, a spacer is provided between the mounting bolt and the vehicle fixing portion.

The above-mentioned construction of the shoulder anchor device, advantageously, further comprises:

a cover having a through hole for passing the mounting bolt therethrough, the cover having a deformable portion which is deformed by the vehicle fixing portion when the vehicle fixing portion is moved relative to the mounting bolt through the slot.

In the above-mentioned construction of the shoulder anchor device, advantageously, a slit is formed in the cover, and extends from that portion of the through hole, disposed close to the anchor fixing portion, in the direction of the length of the base member.

In the above-mentioned construction of the shoulder anchor device, advantageously, the cover has a hook which is engaged with the vehicle fixing portion when the deformable portion is deformed.

In the above-mentioned construction of the shoulder anchor device, advantageously, a hook is provided between the mounting bolt and the vehicle fixing portion, and when the vehicle fixing portion is moved relative to the mounting bolt through the slot, the hook is brought into a position between one end of the slot remote from the anchor fixing portion and the mounting bolt.

In the above-mentioned construction of the shoulder anchor device, advantageously, the spacer has a through hole for passing the mounting bolt therethrough, and an engagement portion engaged with one end of the slot close to the anchor fixing portion.

BRIEF DESCRIPTION OF THE DRAWINGS

FIG. 4(A) is a cross-sectional view of a second embodiment having a modified fixing portion;

FIGS. 4(B2) and 4(B3) are cross-sectional views showing a condition after an impact load F is inputted;

FIG. 4(C) is a cross-sectional view of a 4th embodiment having a modified fixing portion;

FIG. 22(A) is a partly-broken, plan view of an adjustable shoulder anchor device of the present invention;

FIG. 22(B) is a partly cross-sectional, side-elevational view thereof; and

DETAILED DESCRIPTION OF THE PREFERRED EMBODIMENTS

Figure 1:
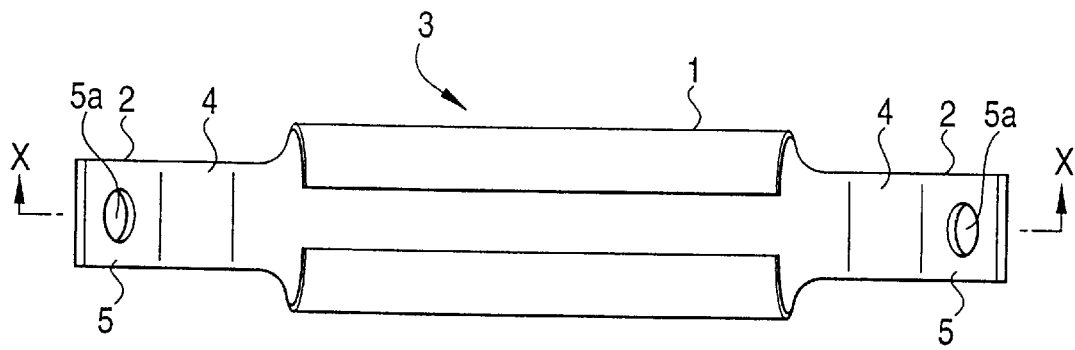
FIG. 1 is a plan view of a first embodiment.

An overall construction of an adjustable shoulder anchor device will first be described with reference to FIGS. 22(A) and 22(B).

FIG. 22(A) is a partly-broken, plan view of the adjustable shoulder anchor device, and FIG. 22(B) is a partly cross-sectional, side-elevational view thereof. The adjustable shoulder anchor device 31 is mounted on a vehicle, with its right side (in these Figures) directed upwardly.

The adjustable shoulder anchor device 31 comprises an operating portion 35 having a through anchor 23 (through which a webbing 22 is passed), and an adjustable base (base member) 3 fixing the operating portion 35 in such a manner that the position of the operating portion 35 can be adjusted. The adjustable base 3 is fixedly secured to a center pillar 29 by bolts 36. The operating portion 35 includes a slider (not shown) slidably mounted on the adjustable base 3, and the through anchor 23 is pivotally supported on a bolt fixedly mounted on the slider.

The operating portion 35 includes a position fixing mechanism for fixing its position relative to the adjustable base 3. This position fixing mechanism comprises a lock pin 40 engageable in any one of a plurality of retaining holes 38 formed in a bottom surface of the adjustable base 3, a spring urging the lock pin 40 in a direction of engagement of this lock pin in the retaining hole 38, a lock cancellation mechanism for retracting the lock pin against the bias of this spring, and a pair of opposed buttons 42 for operating the lock cancellation mechanism. When the pair of buttons 42 are pressed toward each other, the engagement of the lock pin 40 in the retaining hole 38 is canceled, and the slider (not shown), which is received in the adjustable base 3, and is connected to the operating portion 35, is positioned relative to the adjustable base. By adjusting the fixed position of the slider, the through anchor 23 can be set at a position suitable for the passenger.

The adjustable shoulder anchor device 31, after fixedly secured to the center pillar 29, is covered with a cover through which only the operating portion 35 and the through anchor 23 are exposed. This cover has an opening which allows the operating portion 35 to move when adjusting the position of the through anchor 23. A slide plate (garnish) 44 is fixedly secured to the underside of the operating portion 35, and the opening in the cover is closed by the slide plate 44.

Next, a first embodiment of the present invention will now be described with reference to FIGS. 1 to 3.

Figure 2:
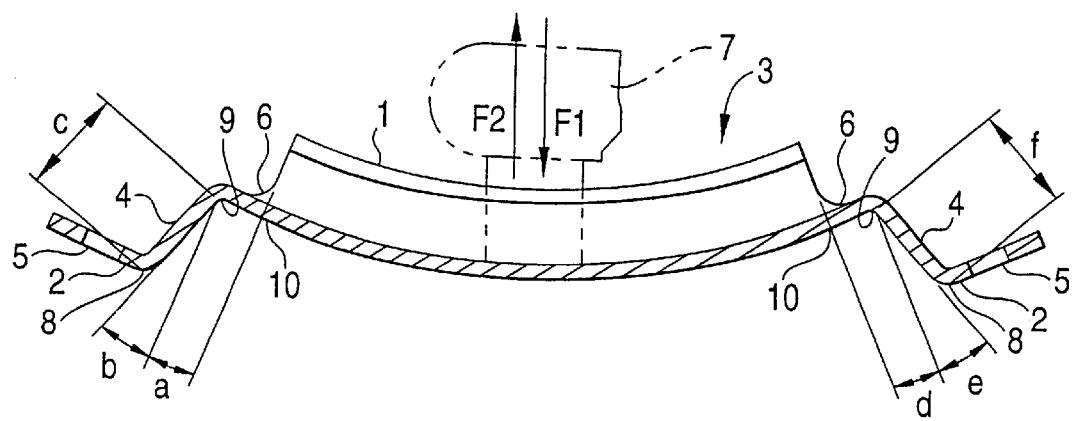
FIG. 2(A) is a cross-sectional view of the first embodiment before buckling.
FIG. 2(B) is a cross-sectional view of the first embodiment in a buckled condition.
Figure 2:
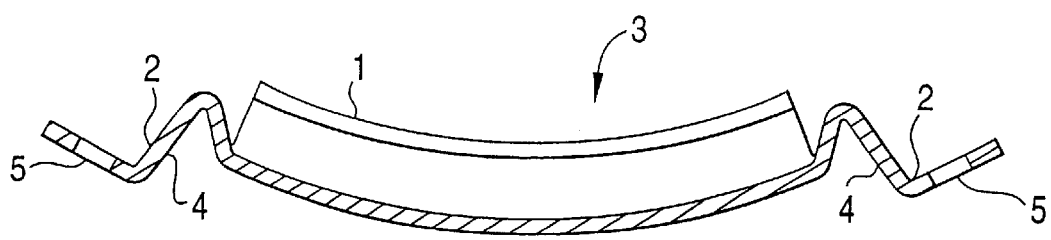
Figure 3:
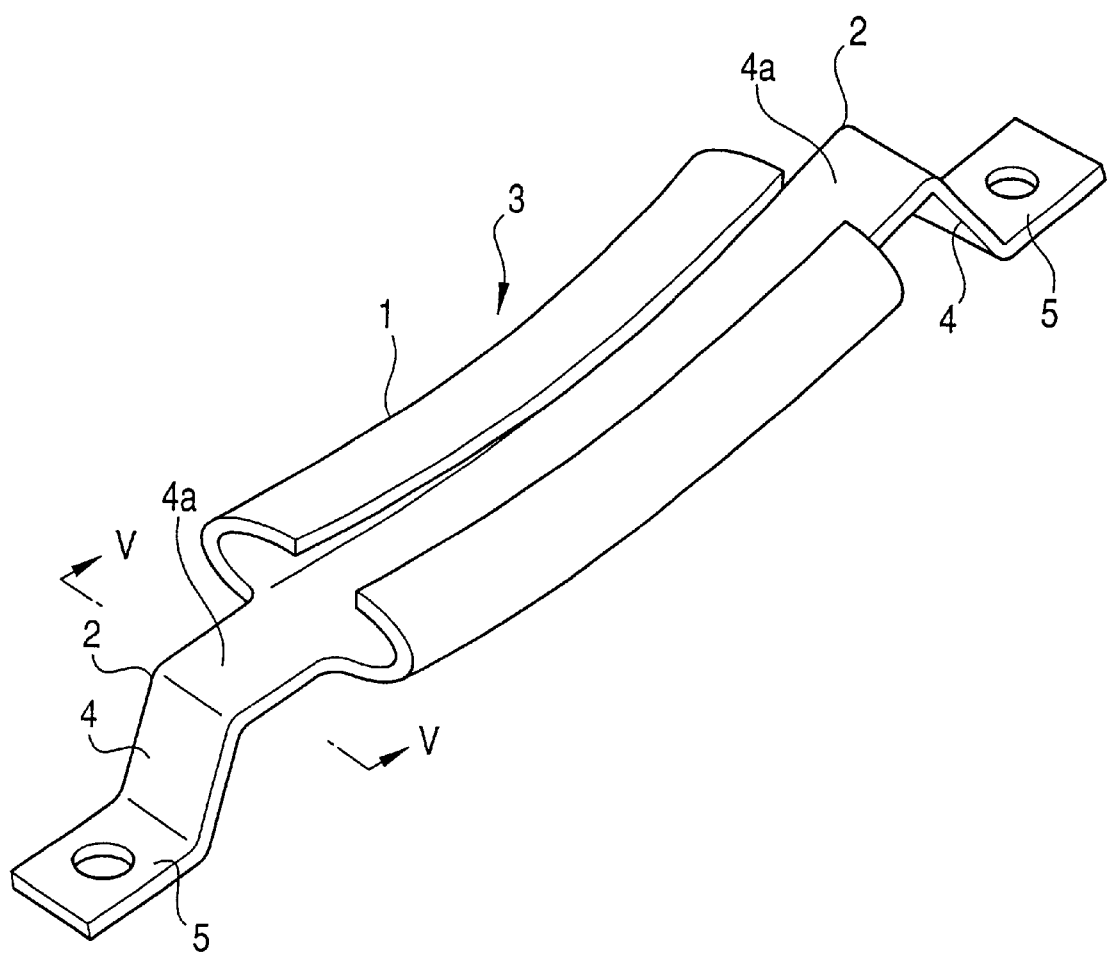
FIG. 3 is a perspective view of the first embodiment.

FIG. 1 is a plan view of an adjustable base of this embodiment, FIG. 2(A) is a cross-sectional view of the adjustable base (taken along the line X—X of FIG. 1 as in the following similar views) which is not buckled since an impact load is not applied thereto, FIG. 2(B) is a cross-sectional view of the adjustable base which is buckled upon application of an impact load, and FIG. 3 is a perspective view of the adjustable base.

In the drawings, for the better understanding of a curved condition of the adjustable base, the illustrated curvature is larger than the actual curvature.

A central portion of the adjustable base 3 is formed into an anchor fixing portion 1 of a channel-shaped (generally C-shaped) cross-section, and this anchor fixing portion 1 has a predetermined width, and extends longitudinally.

A pair of cross-sectionally flat plate-shaped, fixing portions 2 for being fixed to the vehicle body are formed integrally respectively at opposite ends of the anchor fixing portion 1. The adjustable base 3 is constituted by the anchor fixing portion 1 and the pair of fixing portions 2 which are disposed at the opposite ends of the anchor fixing portion 1. Each of the two fixing portions 2 has a leg portion 4, bent relative to the anchor fixing portion 1 toward the vehicle body 29 (FIG. 22), and a mounting portion 5 (for mounting on the center pillar 29) which is in the form of a flat plate, and extends outwardly from the leg portion 4. The two fixing portions 2 are symmetrical. The mounting portions 5 are fixedly secured to the center pillar by nuts and bolts passing respectively through through holes 5a formed respectively through the mounting portions 5.

As shown in FIG. 2(A), a curved portion 6 is formed at an interconnecting portion interconnecting each end of the anchor fixing portion 1 and the associated fixing portion 2.

Although a shoulder belt anchor 7, through which a seat belt (not shown) extends, is fixed to the anchor fixing portion 1 in the same manner as that of the conventional construction, this will not be described in detail.

In this embodiment of the above construction, when an impact load F1 is applied to the anchor fixing portion 1, the anchor fixing portion 1 is flexed toward the fixing portions 2, that is, toward the center pillar, and also interconnecting portions 8 each interconnecting each mounting portion 5 and the associated leg portion 4, upper corner portions 9 of the leg portions 4, and interconnecting portions 10, each interconnecting each fixing portion 2 and the anchor fixing portion 1, are buckled to cushion the impact, thereby securing the safety of the passenger.

When a tensile load F2 is applied to the anchor fixing portion 1 through the seat belt, the anchor fixing portion 1 exhibits a high tensile strength as achieved in the conventional construction, and sufficiently withstands the tensile load F2, and is less deformed, thereby safely holding the passenger, since the anchor fixing portion 1 has a channel-shape. And besides, since the curved portion 6 is formed between the anchor fixing portion 1 and each fixing portion 2 fixed to the vehicle body, the tensile strength is further increased.

The buckling load and the deformation amount due to the impact load F1 and the tensile load F2 are closely related to the length, thickness and radius of curvature of the anchor fixing portion 1 and the length and thickness of the fixing portions 2, and the length and angle of the various portions, the size of the curved portions 6, and the material of the adjustable base 3.

These relations will be described below in detail.

As shown in FIG. 2(A), the length (of each extension portion 4a) from each interconnecting portion 10 (interconnecting the anchor fixing portion 1 and the fixing portion 2) to the associated upper corner portion 9 of the leg portion 4 is represented by a, d, and the angle of each leg portion 4 at the upper corner portion 9 is represented by b, e, and the length of each leg portion 4 is represented by c, f.

If the value of a and d is increased, the buckling load at each interconnecting portion (interconnecting the anchor fixing portion 1 and the fixing portion 2) is decreased. And besides, since the flexing and deformation amounts are increased, the amount of displacement of each of the anchor fixing portion 1 and the adjustable base is increased, and the amount of outward displacement of the anchor point relative to the passenger room is increased.

In contrast, if the value of a and d is decreased, a performance reverse to the above performance is obtained with respect to the impact load F1. Namely, the buckling load at each interconnecting portion 10 is increased. With respect to the tensile load F2, the deformation amount is decreased.

If the value of c and f is increased, the load, under which the leg portions 4 begin to be deformed, is decreased, and the amount of deformation (that is, angle of angular movement) of the leg portions 4 is increased. And besides, the amount of displacement of the anchor fixing portion 1 is increased, so that the cushioning properties are enhanced.

In contrast, if the value of c and f is decreased, a performance reverse to the above performance is obtained with respect to the impact load F1. Namely, the load under which the leg portions 4 begin to be deformed, is increased, and the amount of deformation of the leg portions 4 is decreased, and the amount of displacement of the anchor fixing portion 1 is decreased, and the anchor fixing portion 1 is less liable to be deformed. With respect to the tensile load F2, the amount of deformation is decreased.

If the angle b and e is increased, an initial reaction force is decreased with respect to the impact load F1, and also the load under which the leg portions 4 begin to be deformed is decreased.

In contrast, if the angle b and e is decreased, a performance reverse to the above performance is obtained with respect to the impact load F1, and the initial reaction force is increased, and also the load under which the leg portions 4 begin to be deformed is increased. And besides, a large load acts on the extension portions 4a (a and d), and the extension portions 4a are liable to be buckled. And, the buckling load at each buckling portion is increased.

Thus, the above lengths and angle have their respective characteristics with respect to the impact load F1 and the tensile load F2, and therefore by increasing or decreasing one of a and d, one of b and e and one of c and f, or by suitably determining all of a to f, and by suitably determining the size of the curved portions 6, the adjustable base 3, having desired characteristics, can be obtained.

Thus, by suitably determining a to f, the buckling load of the various portions, the deformation amount thereof, the position of deformation thereof, the order of deformation of these portions, the amount of displacement thereof, and the time of deformation thereof can be adjusted, and therefore the amount of deformation of the anchor fixing portion 1, the amount of displacement thereof, the time of deformation thereof, and so on can be controlled in a desired manner. For example, the adjustable base 3 can be so determined that it can be deformed sequentially from its upper portion toward its lower portion. With this construction, for example, when the face/head of the passenger linearly strikes against the adjustable shoulder anchor device, each of the buckling load, the buckling position and the deformation amount is sequentially changed with time, and by doing so, an angular motion is imparted to the face/head of the passenger, thereby passing reaction forces of the striking load applied from the adjustable shoulder anchor device and the center pillar. Thus, the behavior of that portion against which the passenger strikes can be controlled, thereby further enhancing the safety of the passenger.

Next, 2nd, 3rd and 4th embodiments will be described with reference to FIGS. 4(A), 4(B1), 4(B2), 4(B3) and 4(C). Those portions identical in construction to those of the first embodiment will be designated by identical reference numerals, respectively. These embodiments are directed to modified forms of the fixing portions 2.

In FIG. 4(A), each of fixing portions 2a, formed respectively at opposite ends of a channel-shaped anchor fixing portion 1, has no leg portion 4 of the first embodiment, and the two fixing portions 2a are formed integrally with a bottom plate portion 1a of the anchor fixing portion 1 in such a manner that the fixing portions 2a and the bottom plate portion 1a are disposed in a common plane (curved plane).

With this construction, the whole of the cross-sectionally generally-plane portion can be flexed, and therefore the impact-absorbing effect is enhanced.

Figure 4:
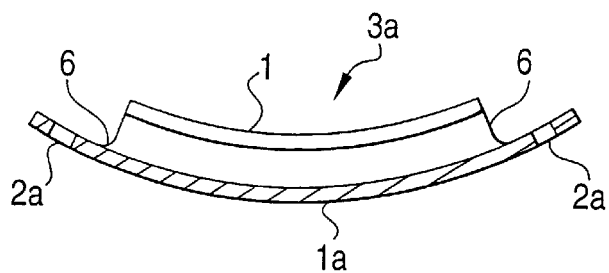
FIG. 4(B1) is a cross-sectional view of a third embodiment, having a modified fixing portion, before the inputting of an impact load.
Figure 4:
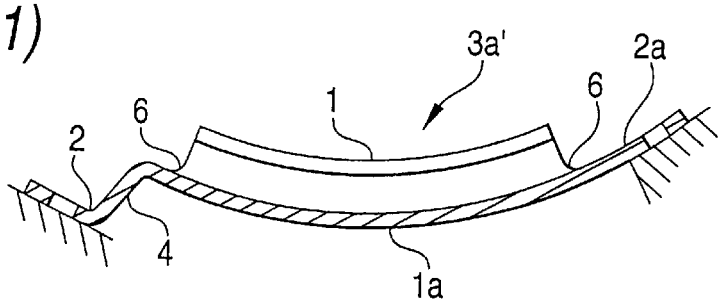
Figure 4:
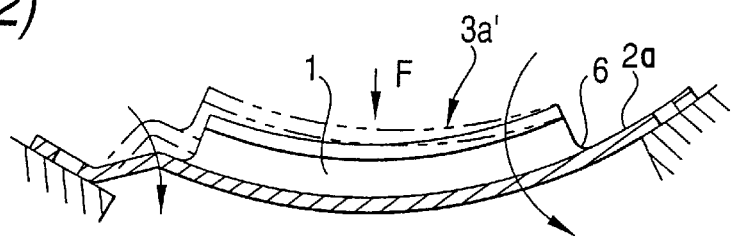
Figure 4:
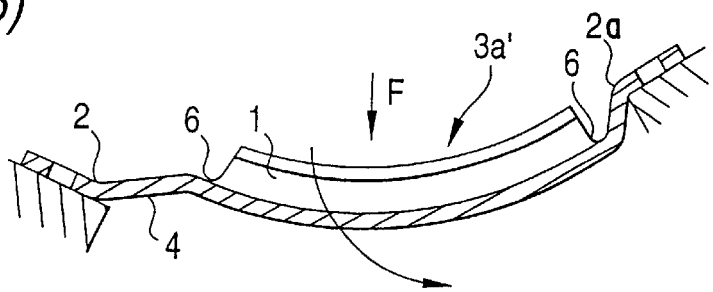
Figure 4:
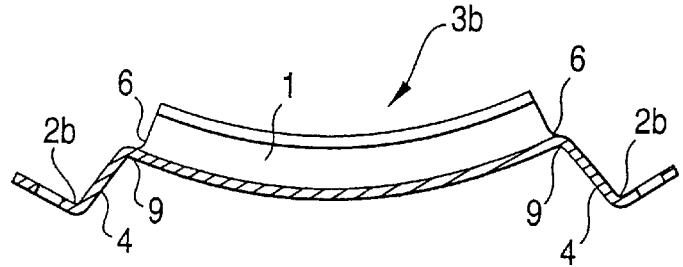

In FIG. 4(B1), one (2) of fixing portions 2 and 2a, formed respectively at opposite ends of a channel-shaped anchor fixing portion 1, has a leg portion 4 similar to the leg portion 4 of the first embodiment, and the other fixing portion 2a has no leg portion 4 as described above for the second embodiment, and this fixing portion 2a and a bottom plate portion 1a of the anchor fixing portion 1 are disposed in a common plane (curved plane). FIGS. 4(B2) and 4(B3) show a condition after an impact load F is applied to the anchor fixing portion. The fixing portion 2a with no leg portion is bent while the fixing portion 2 with the leg portion 4 is expanded into a shape close to a plane, and therefore the two fixing portions 2 and 2a will not act against each other, and the deformation amount and the load are balanced, so that the anchor fixing portion 1 can be smoothly deformed. And besides, the anchor fixing portion 1 is slid and angularly moved in directions of arrows, and therefore utilizing this, the behavior of the passenger is controlled, thereby passing a reaction force from the center pillar.

In FIG. 4(C), each of fixing portions 2b and 2b, formed respectively at opposite ends of a channel-shaped anchor fixing portion 1, has a leg portion 4, and the anchor fixing portion 1 longitudinally extend to upper corner portions 9, and each fixing portion has no extension portion. Namely, the leg portions 4 are formed respectively at the opposite ends of the anchor fixing portion 1. This construction is one of examples in which the amount of deformation upon application of a tensile load is the smallest.

Next, 5th, 6th and 7th embodiments will be described respectively with reference to FIGS. 5(A), 5(B) and 5(C). Those portions identical in construction to those of the first embodiment will be designated by identical reference numerals, respectively. These embodiments are directed to modified fixing portions different in cross-sectional shape along with an arrow V—V from the fixing portion 2 of FIG. 3. These fixing portions are less liable to be deformed upon application of a tensile load, but can be easily deformed upon application of an impact load by the passenger.

Figure 5:
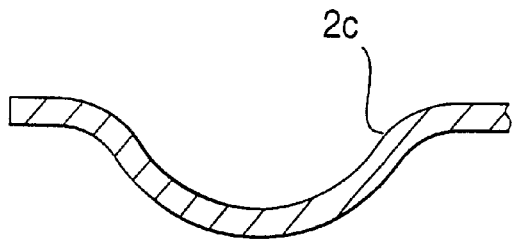
FIGS. 5(A) to 5(C) are cross-sectional views of fixing portions of 5th, 6th and 7th embodiments, respectively.
Figure 5:
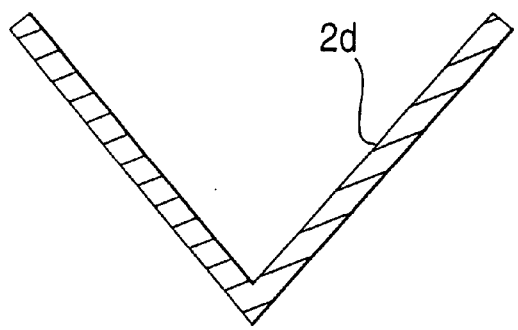
Figure 5:
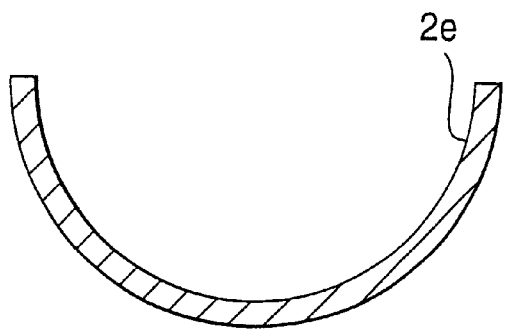

In FIG. 5(A), a central portion of the fixing portion 2c is formed into an arcuate shape. In FIG. 5(B), the whole of the fixing portion 2d is formed into a V-shape. In FIG. 5(C), the whole of the fixing portion 2e is formed into a generally U-shape.

In the present invention, "the cross-sectionally generally flat plate-shaped fixing portions for being fixed to the vehicle body" mean all the portions of the adjustable base except the channel portion of a C-shaped cross-section, and examples thereof include those of the cross-sectional shapes shown in FIGS. 5(A)–5(C).

Next, 8th and 9th embodiments will be described respectively with reference to FIGS. 6(A) and 6(B). These embodiments are directed to modified forms of the mounting portion of the fixing portion for mounting on the center pillar.

Figure 6:
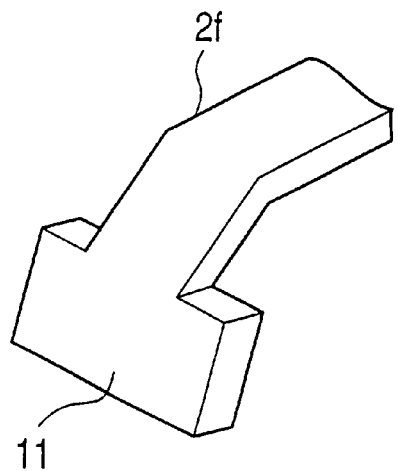
FIGS. 6(A) and 6(B) are fragmentary, perspective views of fixing portions of 8th and 9th embodiments, respectively.
Figure 6:
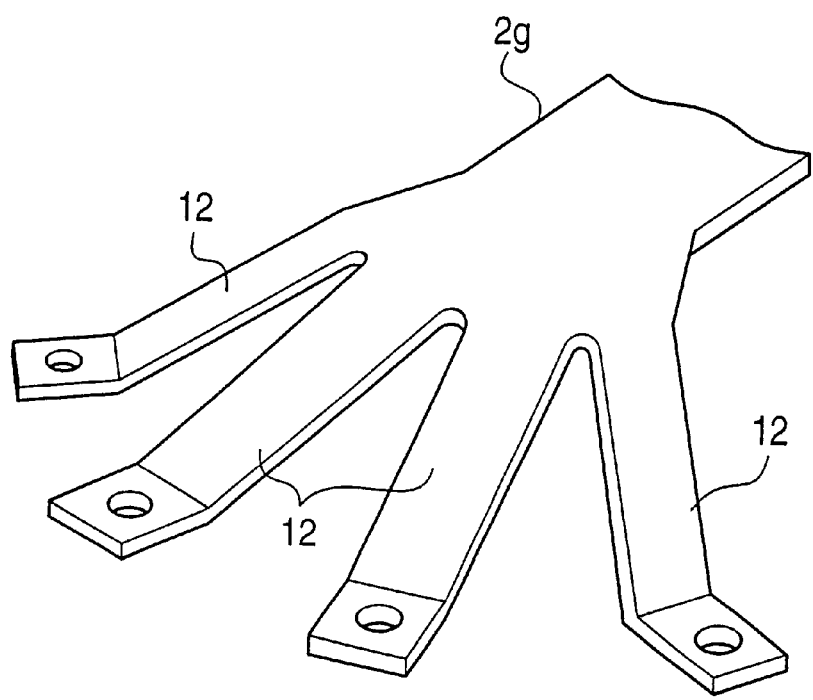

In FIG. 6(A), a mounting portion 11 of a fixing portion 2f is formed into a hook-like shape, and an adjustable base 3 is mounted on the center pillar by fitting the hook-like mounting portion 11 in a recess formed in the center pillar.

With this construction, it is only necessary to fit the hook-like mounting portions 11 respectively in the recesses, and therefore the mounting of the adjustable base 3 can be effected easily, and besides it is not necessary to use any fastening members such as bolts.

In FIG. 6(B), a fixing portion 2g has a plurality of mounting portions 12. An adjustable base 3 is mounted on the center pillar through the mounting portions 12. Each of the plurality of the mounting portions 12 is narrow (that is, has a small width) and elongate, and therefore the mounting portions 12 can be easily deformed upon application of an impact load by the passenger. However, a plate material (or a wire material), constituting the mounting portions 12, can withstand a high tensile stress, and therefore the amount of deformation of the mounting portions 12 upon application of a tensile load is small, and the mounting portions 12 maintain the high strength.

With this construction, the adjustable base can be firmly fixed to the center pillar, and besides the impact load and the tensile load are distributed, and the amount of deformation of the anchor fixing portion 1, as well as the amount of displacement thereof, can be arbitrarily adjusted.

Figure 7:
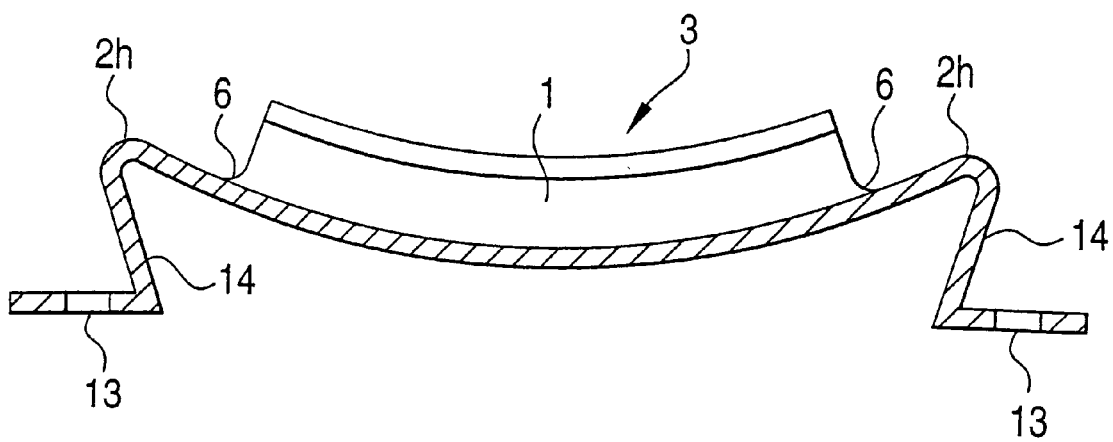
FIG. 7(A) is a cross-sectional view of a 10th embodiment before buckling.
FIG. 7(B) is a cross-sectional view of the 10th embodiment in a buckled condition.
Figure 7:
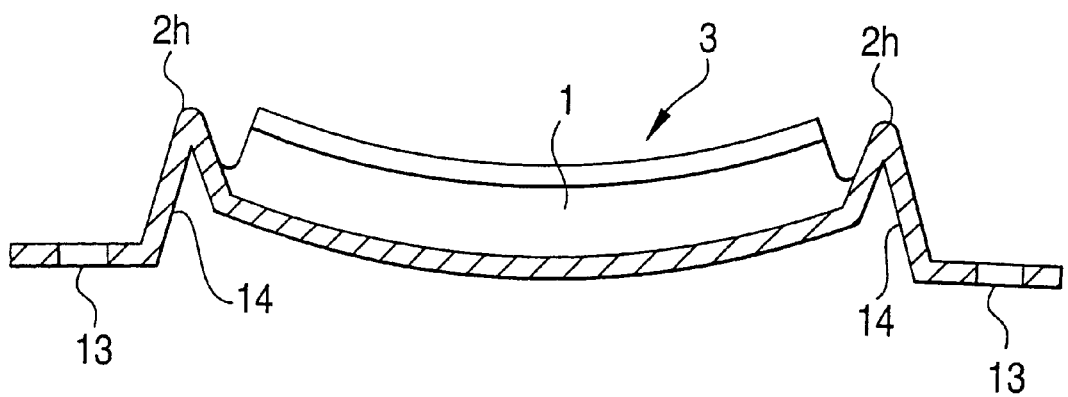

Next, a 10th embodiment will be described with reference to FIGS. 7(A) and 7(B).

In this embodiment, a leg portion 14 of each of fixing portions 2h (formed respectively at opposite ends of an anchor fixing portion 1), extending from the anchor fixing portion 1 to a distal end of a corresponding mounting portion 13, is bent or formed into a generally Z-shape. By thus forming the leg portions 14 into a Z-shape, a desired cross-sectionally generally plane-like length can be set even if the distance between the mounting portions 13 is short. FIG. 7(A) is a cross-sectional view showing a condition before buckling, and FIG. 7(B) is a cross-sectional view showing a condition in which the buckling occurs upon application of an impact load.

Figure 8:
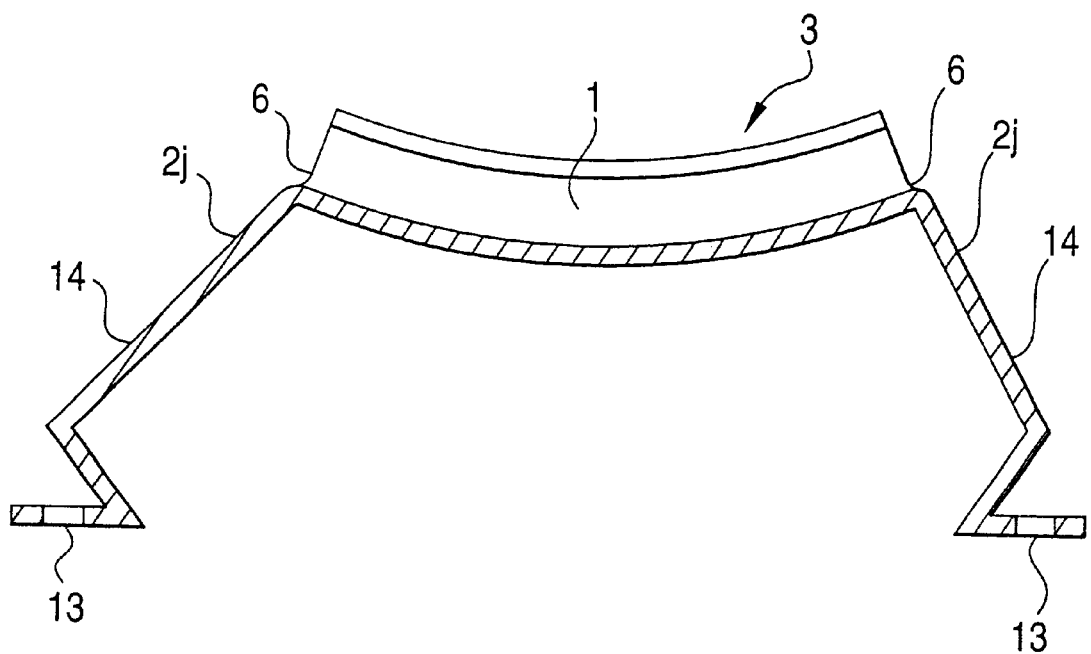
FIG. 8(A) is a cross-sectional view of a 11th embodiment before buckling.
FIG. 8(B) is a cross-sectional view of the 11th embodiment in a buckled condition.
Figure 8:
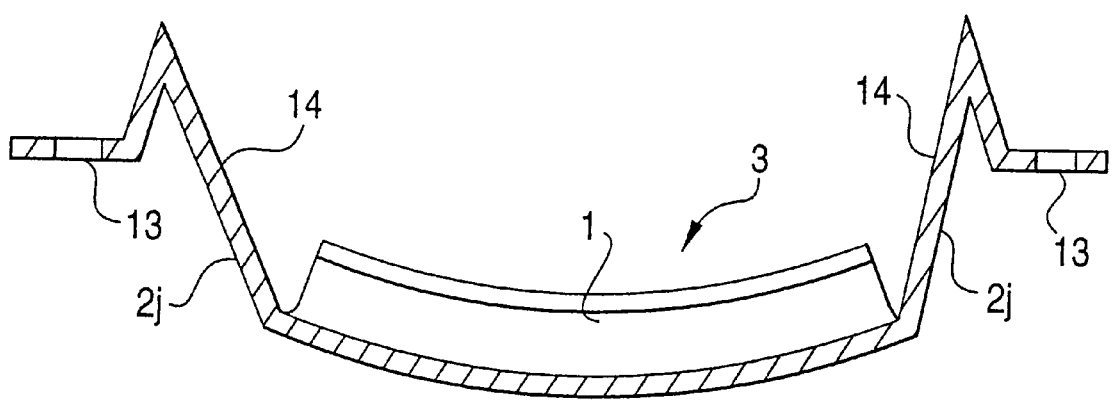

Next, an 11th embodiment will be described with reference to FIGS. 8(A) and 8(B).

In this embodiment, a leg portion 14 of each of fixing portions 2j (formed respectively at opposite ends of an anchor fixing portion 1), extending from the anchor fixing portion 1 to a corresponding mounting portion 13, is outwardly bent into a V-shape (recumbent V-shape), the two leg portions 14 being bent in a symmetrical manner. One of the leg portions 14 is longer than the other. FIG. 8(A) is a cross-sectional view showing a condition before buckling, and FIG. 8(B) is a cross-sectional view showing a condition in which the buckling occurs upon application of an impact load.

By increasing the length of the leg portions 14, the amount of displacement of the anchor fixing portion 1 is increased. In order that the long leg portions 14 may not hinder the deformation at the time of buckling, the leg portions 14 are formed into an outwardly-convex, V-shape. Therefore, the two leg portions 14 are first moved outwardly away from each other, so that the anchor fixing portion 1 begins to be displaced, and then the two leg portions 14 are moved toward each other in accordance with the displacement of the anchor fixing portion 1. After the displacement of the anchor fixing portion 1 is finished, the two leg portions 14 act against each other, and will not be returned to their respective initial positions, and therefore a rebounding force will not be imparted to the passenger. By suitably changing the length and angle of the leg portions, the leg portions will not act against each other at the time of buckling, so that the deformation can be effected smoothly.

Figure 9:
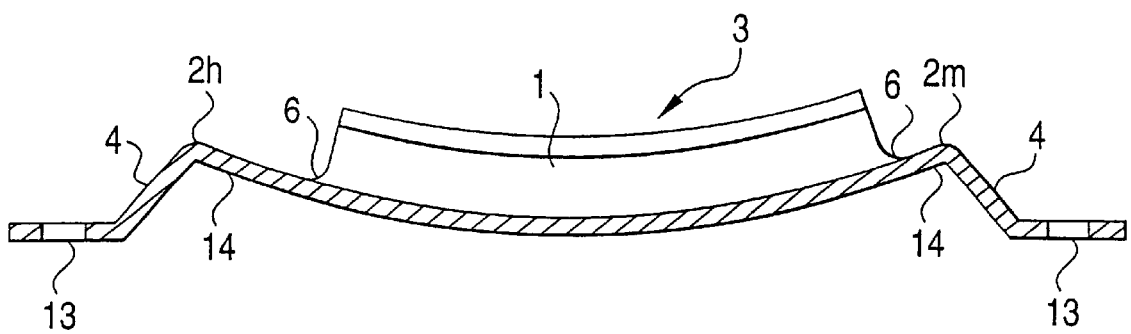
FIG. 9(A) is a cross-sectional view of a 12th embodiment before buckling.
FIG. 9(B) is a cross-sectional view of the 12th embodiment n a buckled condition.
Figure 9:
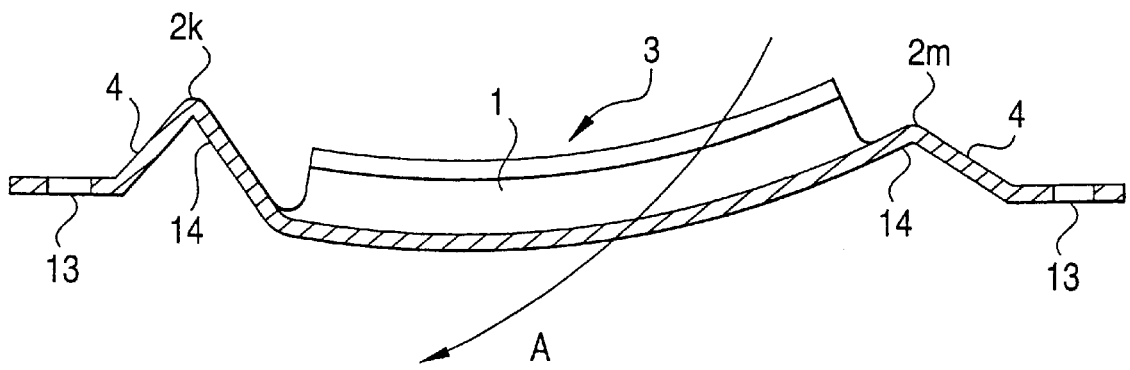

Next, a 12th embodiment will be described with reference to FIGS. 9(A) and 9(B).

In this embodiment, that portion (one extension portion), extending from one end of an anchor fixing portion 1 to a leg portion 4 of a fixing portion 2k, is longer than that portion (the other extension portion) extending from the other end of the another fixing portion 1 to a leg portion 4 of a fixing portion 2m. FIG. 9(A) is a cross-sectional view showing a condition before buckling, and FIG. 9(B) is a cross-sectional view showing a condition in which the buckling occurs upon application of an impact load.

As in the 10th, 11th and 12th embodiments, when the leg portion 14 are formed into a generally Z-shape, or one of the leg portions 14 is longer than the other, the characteristics of the leg portions 14 can be arbitrarily adjusted with respect to an impact load and a tensile load, and therefore the strength of the leg portions 14 against an impact load, the strength against a tensile load and the amount of deformation thereof can be arbitrarily changed.

When the two extension portions (each extending between the anchor fixing portion 1 and the associated leg portion 4) are different in length from each other as in the 12th embodiment, the two fixing portions 2k and 2m are different in the buckling load, the deformation amount and the deformation time from each other upon application of an impact load, and the two leg portions 4, provided respectively at opposite end portions of an adjustable base 3, will not be deformed at the same time, and therefore will not act against each other in the direction of the length of the anchor fixing portion 1. And besides, since the anchor fixing portion 1 is forced to be displaced from the shorter leg portion 4 (on the fixing portion 2m side) toward the longer leg portion 4 (on the fixing portion 2k side), the adjustable base 3 can be smoothly deformed along an arrow A in FIG. 9(A), and all the relevant portions of the adjustable base 3 can be crushed without fail. Furthermore, since the anchor fixing portion 1 slides, a reaction force, applied from the center pillar to the passenger, can be passed.

Figure 10:
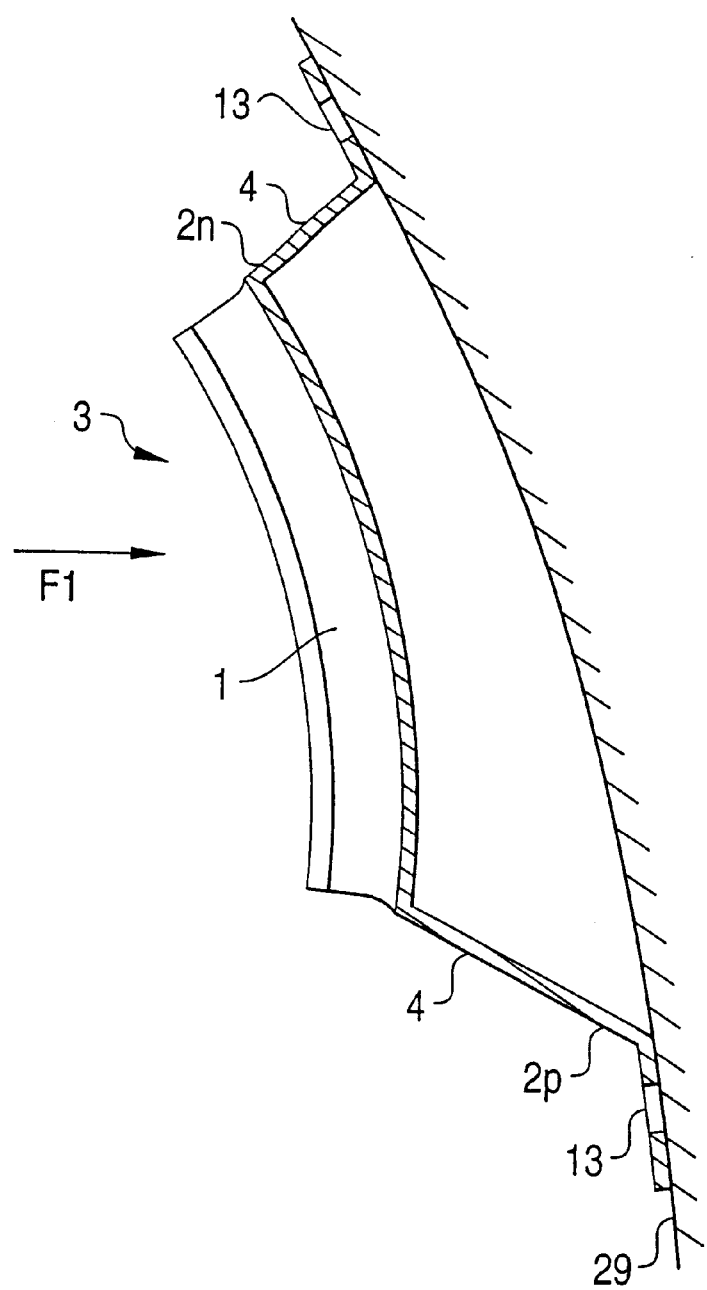
FIG. 10 is a cross-sectional view of a 13th embodiment before buckling.

Next, a 13th embodiment will be described with reference to FIG. 10. In this embodiment, in view of an inclination angle of a center pillar 29, the angle of bending of leg portions 4 relative to an anchor fixing portion 1, as well as the length of the leg portions 4, is suitably determined, and by changing the angle of the leg portions 4, a cushioning effect is enhanced. In the case where a load F1 is inputted to the center pillar 29 at a certain angle, the angle of bending of the upper leg portion 4 (on the fixing portion 2n side) relative to the anchor fixing portion 1 is smaller than the angle of bending of the lower leg portion 4 (on the fixing portion 2p side) relative to the anchor fixing portion 1.

With this construction, even when an impact load F1 is applied in a horizontal direction to the adjustable base 3 mounted in an inclined manner on the center pillar 29, an angular moment, acting on an interconnecting portion, interconnecting the anchor fixing portion 1 and the upper leg portion 4, is equal to an angular moment acting on an interconnecting portion interconnecting the anchor fixing portion 1 and the lower leg portion 4, and the amount of deformation of the upper leg portion 4 is equal to that of the lower leg portion 4, thereby enhancing a cushioning effect. There may be used an arrangement in which the amount of the moment, acting on the upper interconnecting portion, is different from the amount of the moment acting on the lower interconnecting portion, and in this case the amount of deformation of the upper leg portion 4 is different from that of the lower leg portion 4, and the time, required for complete crushing of the upper leg portion 4 is different from the time required for complete crushing of the lower leg portion 4. By doing so, the behavior of the passenger, striking against the anchor device, can be controlled.

Next, a 14th embodiment of the present invention will be described with reference to FIGS. 11 to 12.

Figure 11:
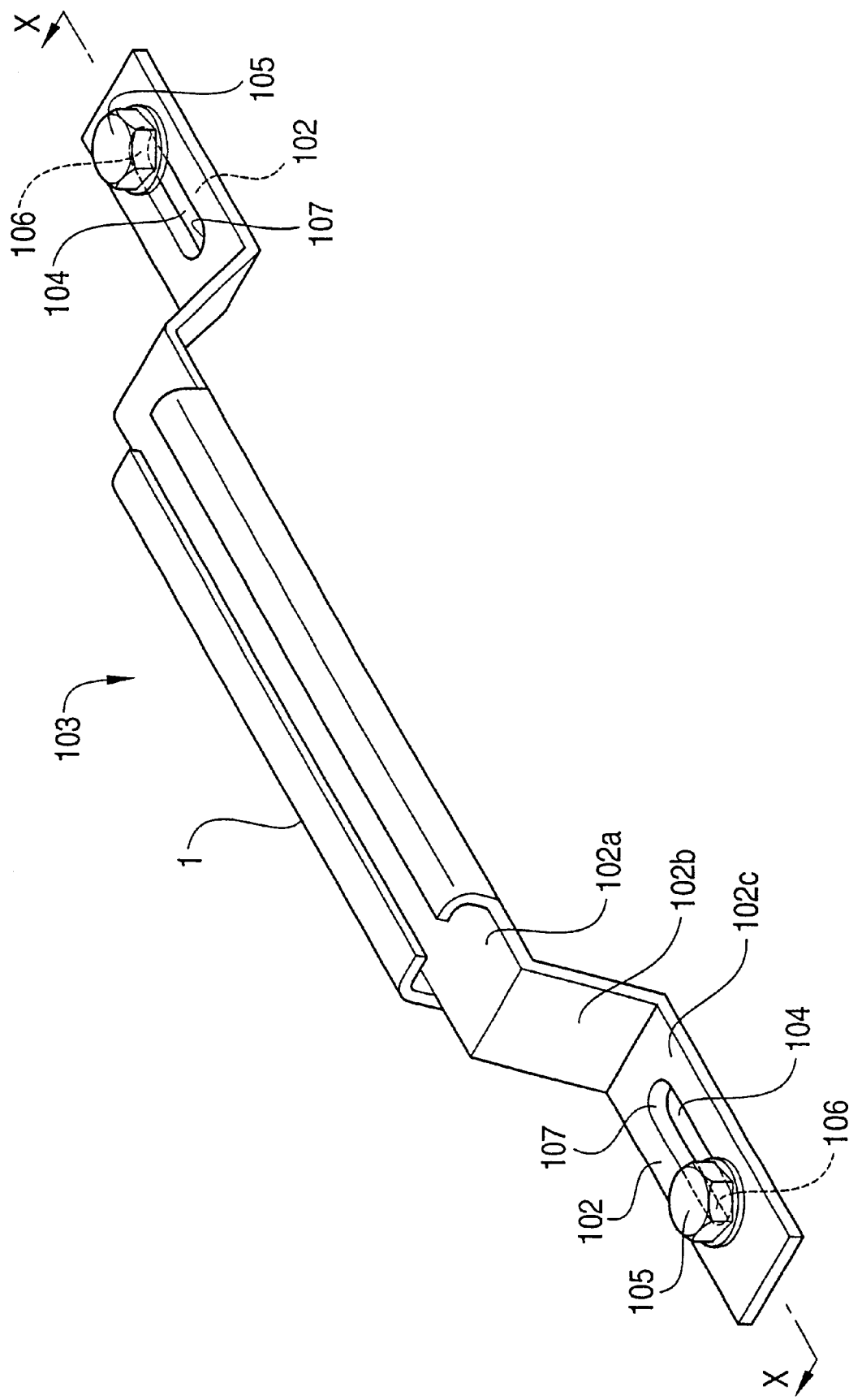
FIG. 11 is a perspective view showing an overall construction of a 14th embodiment.
Figure 12:
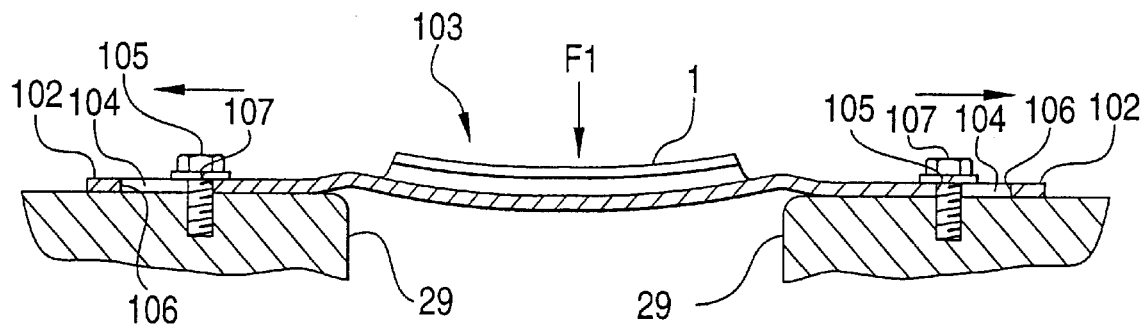
FIG. 12(A) is a cross-sectional showing a rail member of the 14th embodiment in a mounted condition, which is buckled upon application of an impact load.
FIG. 12(B) is a cross-sectional view showing the rail member which is further pressed upon application of a larger impact load.
FIG. 12(C) is a cross-sectional view showing a condition in which the rail member is subjected to a tensile load.
Figure 12:
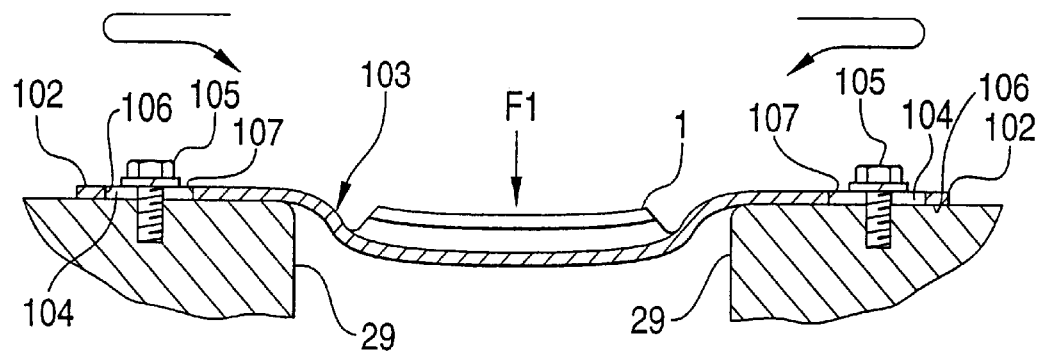
Figure 12:
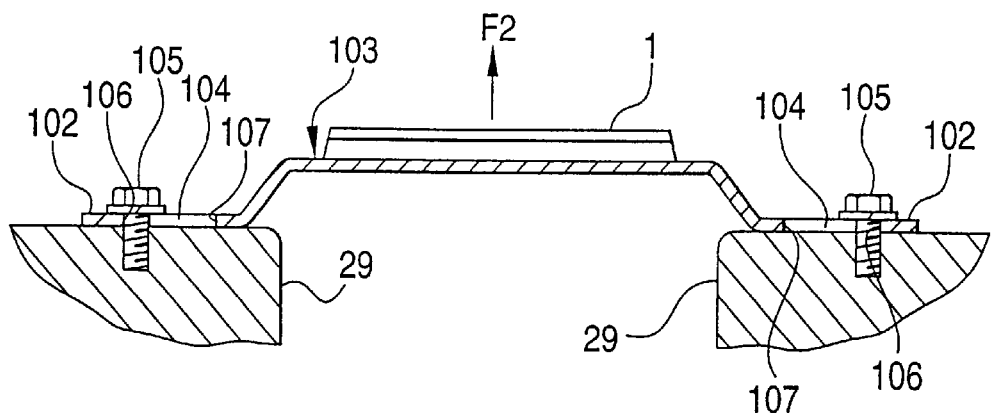

FIG. 11 is a perspective view showing an overall construction of this embodiment, FIG. 12(A) is a cross-sectional showing a rail member in a mounted condition, which is buckled upon application of an impact load, FIG. 12(B) is a cross-sectional view showing the rail member which is further pressed upon application of a larger impact load, and FIG. 12(C) is a cross-sectional view showing a condition in which the rail member is subjected to a tensile load.

A central portion of the rail member 103 serves as an anchor fixing portion 1 which has a generally C-shaped cross-section, and has a predetermined width, and extends longitudinally. A slider, connected to a through anchor 23, is slidably mounted in the anchor fixing portion 1 of a generally C-shaped cross-section.

A pair of cross-sectionally flat plate-shaped, fixing portions (hereinafter referred to as "vehicle fixing portions") 102 for being fixed to the vehicle body are formed integrally respectively at opposite ends of the anchor fixing portion 1. The anchor fixing portion 1 and the two vehicle fixing portions 102, provided respectively at the opposite ends thereof, joint constitute the rail member (base member) 103 of a bridge-like shape. As in the first embodiment, each vehicle fixing portion 102 includes an extension portion 102a, a leg portion 102b and a mounting portion 102c.

A slot 104, having opposite rounded ends, is formed through the mounting portion 102c of each of the vehicle fixing portions 102, and extends in a direction of the length of the rail member 103. Mounting bolts 105 are passed respectively through the slots 104, and are threaded into a center pillar 29, thereby fixedly securing the rail member 103 to the center pillar 29. Each mounting bolt 105 is spaced from the inner end of the associated slot 104, so that a gap or space is formed therebetween.

With this construction, the rail member 103, when subjected to an impact load F1, is buckled at buckling portions, and is flexed and deformed, as shown in FIG. 12(A). At this time, the vehicle fixing portions 102 are displaced outwardly. Namely, each of the mounting bolts 105 moves inwardly relative to the associated slot 104 therealong.

Even when each of the fixing portions 102 is fully expanded outwardly, it will not contact the inner end 107 of the slot 104. If the energy can not be absorbed even in this condition, the anchor fixing portion 1 is further pressed as shown in FIG. 12(B), the vehicle fixing portions 102 are again returned inwardly. Therefore, when the impact load F1 is applied, a reaction force of the rail member 103 due to the impact load F1 will not be accumulated, and the reaction force, resulting from the deformation due to the impact load F1, is absorbed, and the reaction force, acting on the passenger, is reduced, thereby enhancing the safety.

When a tensile load F2 is applied as shown in FIG. 12(C), the amount of deformation of the rail member 103 is small as in the conventional construction since each of the mounting bolts 105 is disposed adjacent to the outer end 106 of the associated slot 104, and therefore the ability of holding the passenger is maintained.

Figure 13:
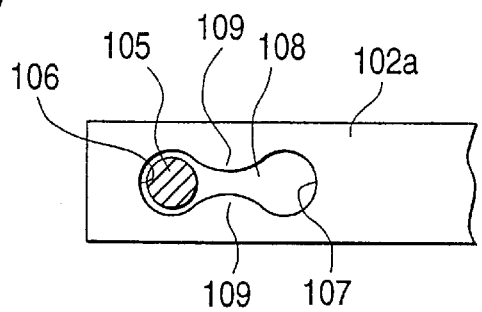
FIG. 13(A) is a plan view of an important portion of a 15th embodiment, with a mounting bolt shown in a cross-section.
FIG. 13(B) is a cross-sectional view of the important portion in a mounted condition.
FIG. 13(C) is a plan view of the important portion after deformation, with the mounting bolt shown in a cross-section.
FIG. 13(D) is a graph showing the relation between a load and a displacement amount obtained when an impact load is inputted.
Figure 13:
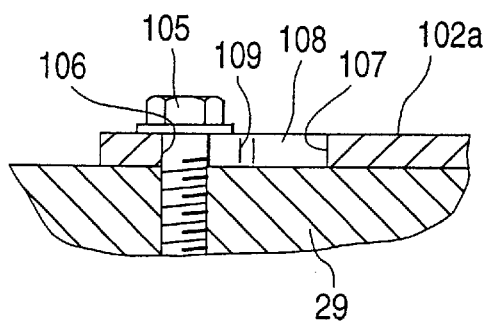
Figure 13:
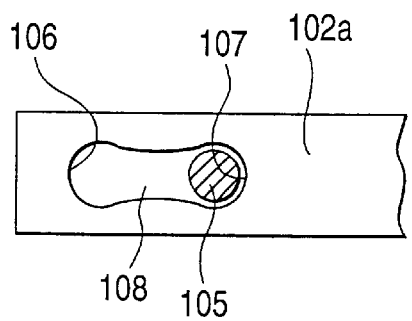
Figure 13:
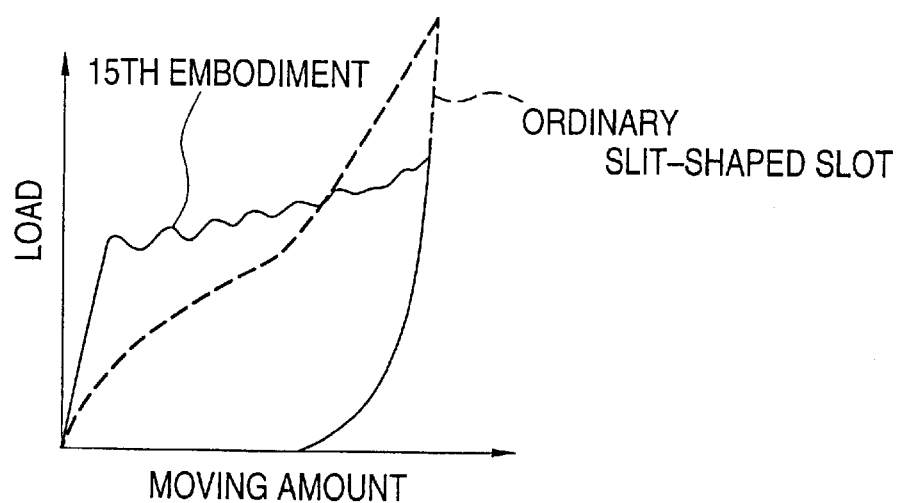

Next, a 15th embodiment of the invention will be described with reference to FIG. 13.

FIG. 13(A) is a plan view of an important portion, with a mounting bolt shown in a cross-section, FIG. 13(B) is a plan view of the important portion in a mounted condition, FIG. 13(C) is a plan view of the important portion after deformation, with the mounting bolt shown in a cross-section, and FIG. 13(D) is a graph showing the relation between a load and a displacement amount obtained when an impact load is inputted.

In this embodiment, also, a slot 108 is formed through each fixing portion 102a, but a central portion of the slot 108 is constricted to provide a constricted portion 109. The graph of FIG. 13(D) shows the comparison between a rail member, in which the slot with the constricted portion 109 is formed through each fixing portion 102a, and a rail member in which an ordinary slot with no constricted portion is formed through the fixing portion 102a. If the energy is absorbed only by a rail member, the absorbing ability is higher in the 12th embodiment.

In this embodiment, when a tensile load is applied, each mounting bolt 105 abuts against an outer end 106 of the slot 108, and therefore the amount of deformation of the rail member is small as in the preceding embodiment. On the other hand, when an impact load is applied, each mounting bolt 105 is brought into engagement with the constricted portion 109 during the outward displacement of the fixing portions 102a, and this offers a resistance, and when an impact load greater than a predetermined value is applied, the mounting bolt 105 is inwardly forced through the constricted portion 109, as shown in FIG. 13(C). As a result, the impact load, applied by the passenger, is received to a certain degree, and then the inputted load is reduced, thereby absorbing the energy efficiently.

Figure 14:
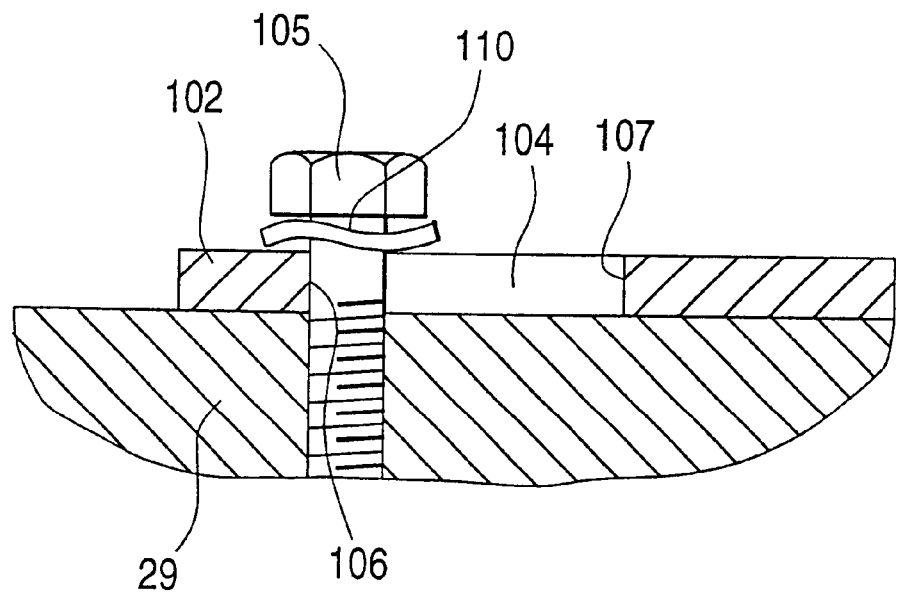
FIG. 14(A) is a cross-sectional view of an important portion of a 16th embodiment in a mounted condition.
FIG. 14(B) is a cross-sectional view of an important portion of a 17th embodiment in a mounted condition.
Figure 14:
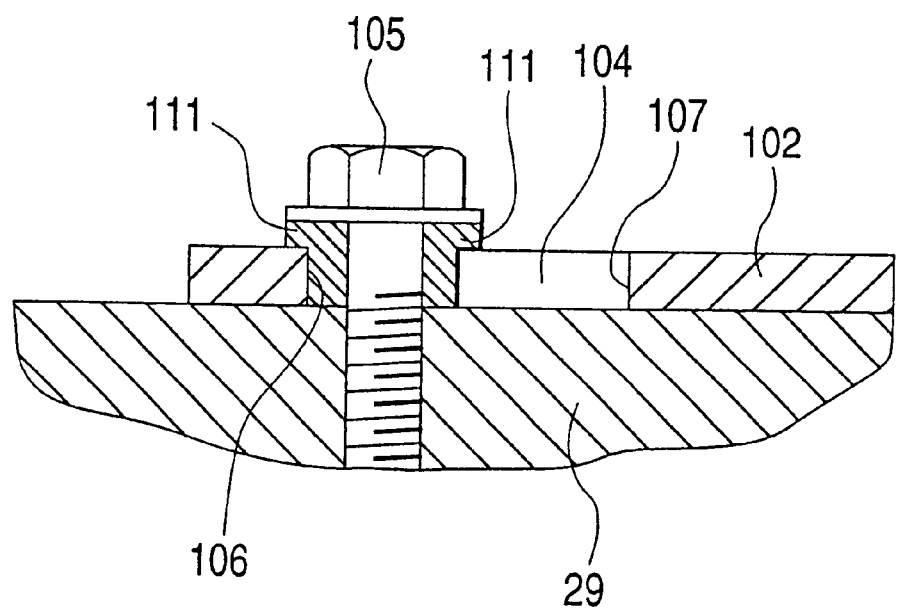

Next, 16th and 17th embodiments will be described respectively with reference to FIGS. 14(A) and 14(B). FIG. 14(A) is a cross-sectional view of an important portion in a mounted condition, and FIG. 14(B) is a cross-sectional view of a important portion in a mounted condition.

In the 16th embodiment of FIG. 14(A), a mounting bolt 105 is fastened through a wavy washer 110.

In the 17th embodiment of FIG. 14(B), a mounting bolt 105 is fastened through a spacer 111.

When the wavy washer 110, the spacer 111 or a stepped bolt, which is made of metal or a resin material, is thus used, each fixing portion 102 can be slid, and therefore a fastening torque for the mounting bolt 105 does not need to be set to a value smaller than an ordinary torque, but the mounting bolt 105 can be fastened with the ordinary torque, and the efficiency of the operation can be maintained.

Figure 15:
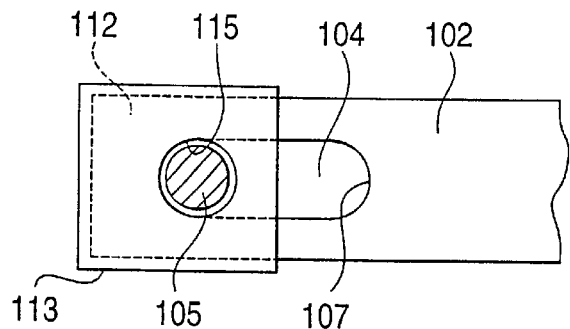
FIG. 15(A) is a plan view of an important portion of an 18th embodiment, with a mounting bolt shown in a cross-section.
FIG. 15(B) is a cross-sectional plan view of the important portion in a mounted condition.
FIG. 15(C) is a graph showing the relation between a load and a displacement amount obtained when an impact load is inputted.
Figure 15:
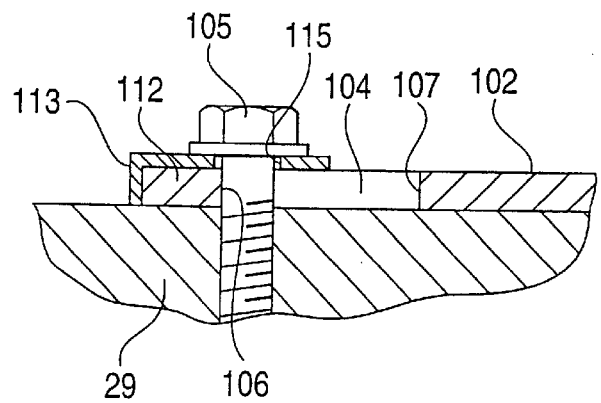
Figure 15:
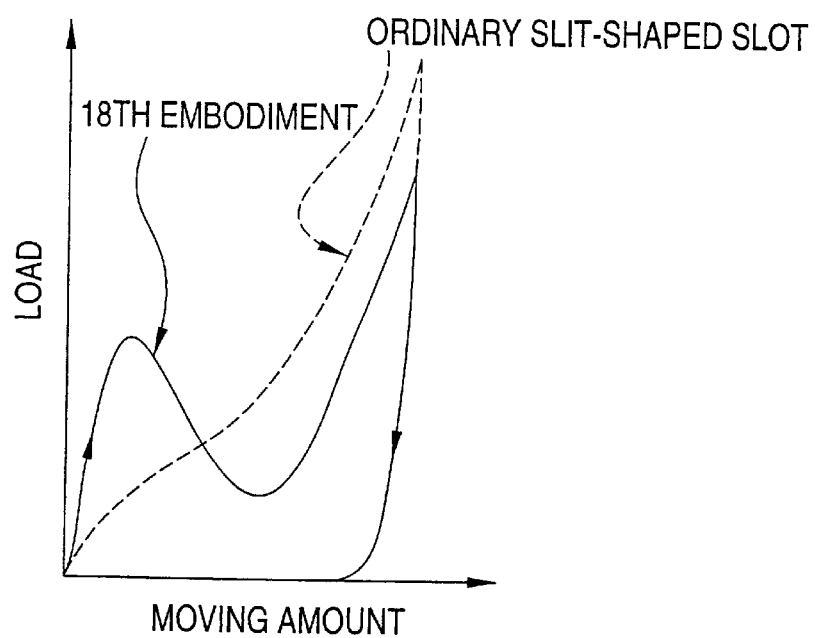

Next, an 18th embodiment of the invention will be described with reference to FIGS. 15(A) and 15(B). FIG. 15(A) is a plan view of an important portion, with a mounting bolt shown in a cross-section, FIG. 15(B) is a plan view of the important portion in a mounted condition, FIG. 15(C) is a graph showing the relation between a load and a displacement amount obtained when an impact load is inputted.

In this embodiment, an end portion 112 of each fixing portion 102 is fixed through a cover 113 which is made of a thin sheet of metal or a synthetic resin, and has a through hole 115 formed through a central portion thereof. The mounting bolt 105 is passed through the through hole 115 in the cover 113, and an outer end 106 of a slot 104 is held between the cover 113 and the mounting bolt 115, thereby positioning the fixing portion 102.

When an impact load is applied, the fixing portion 102 displaced or moved relative to the mounting bolt 105, and breaks or ruptures a closed end of the cover 113, thereby absorbing an impact energy. A first peak of a solid curve in FIG. 15(C) is obtained when this closed end is ruptured.

Next, a 19th embodiment of the invention will be described with reference to FIGS. 16(A) and 16(B).

Figure 16:
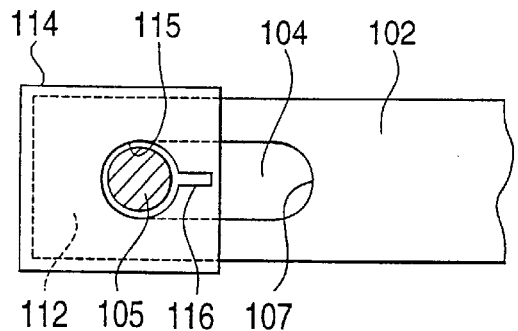
FIG. 16(A) is a plan view of an important portion of 19th embodiment, with a mounting bolt shown in a cross-section.
FIG. 16(B) is a cross-sectional view of the important portion after application of an impact load.
FIG. 16(C) is a graph showing the relation between a load and a displacement amount obtained when the impact load is inputted.
Figure 16:
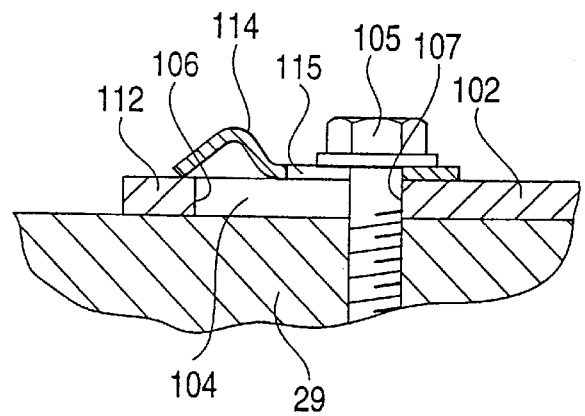
Figure 16:
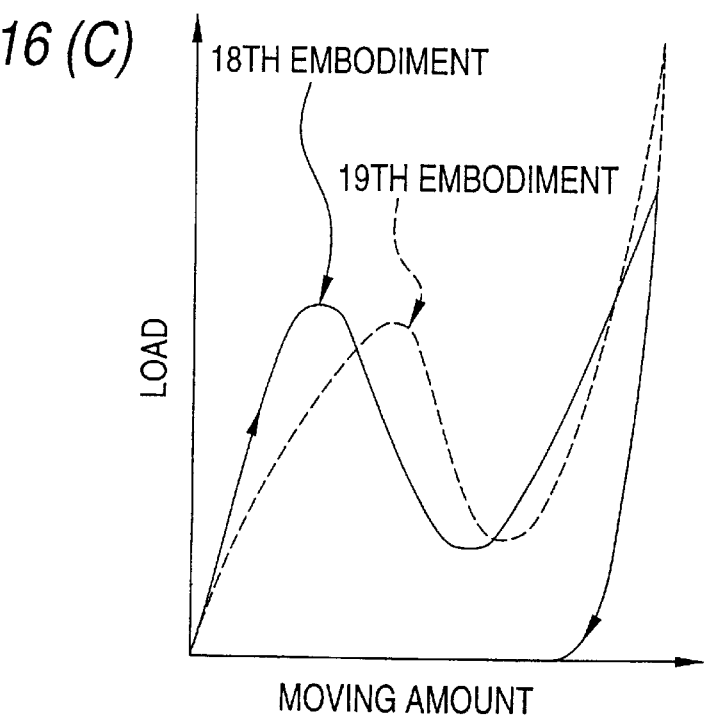

FIG. 16(A) is a plan view of an important portion, with a mounting bolt shown in a cross-section, FIG. 16(B) is a plan view of the important portion after application of an impact load, FIG. 16(C) is a graph showing the relation between a load and a displacement amount obtained when the impact load is inputted.

This embodiment is similar to the above 18th embodiment in that an end portion 112 of each fixing portion 102 is fixed through a cover 114, and that the cover 114 has a through hole 115, and serves as a positioning member and an energy absorbing member.

However, a slit 116 is formed in the cover member 114, and extends inwardly from the through hole 115.

Therefore, when an impact load is applied, the slit 116 is spread, so that an initial restraining force to restrain the end portion 112 is smaller as compared with the 18th embodiment.

Figure 17:
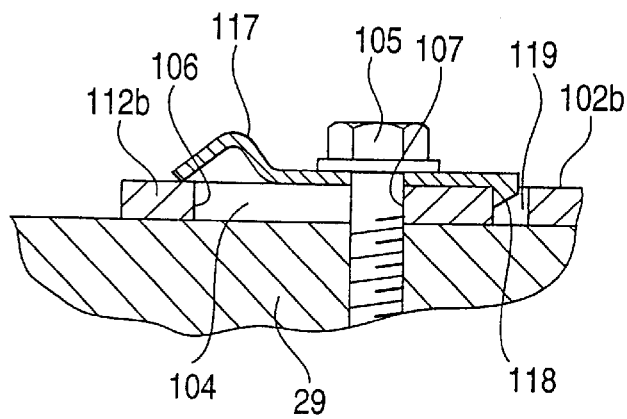
FIG. 17(A) is a cross-sectional view of an important portion of a 20th embodiment.
FIG. 17(B) is a graph showing the relation between a load and a displacement amount obtained when an impact load is inputted.
Figure 17:
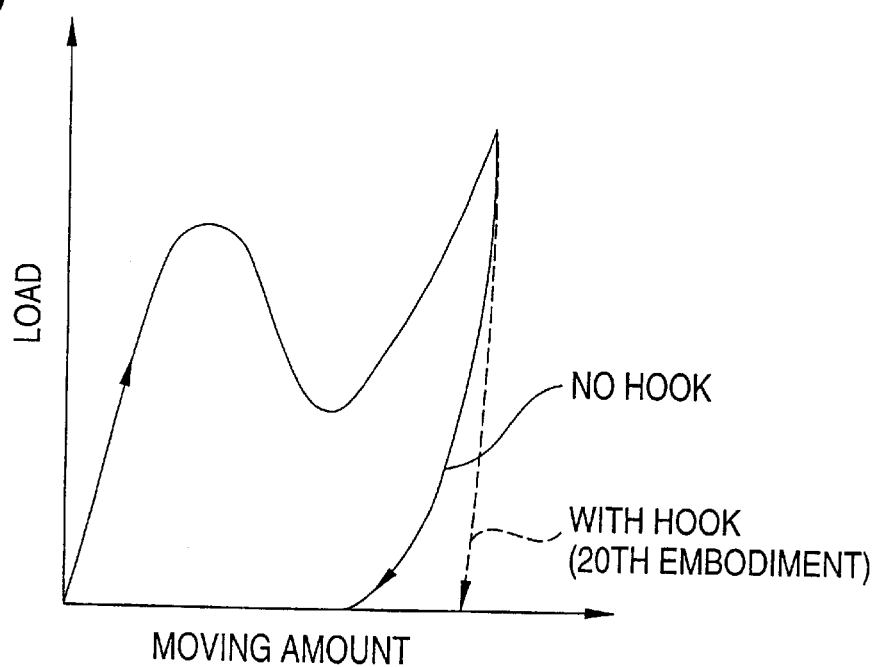

Next, a 20th embodiment of the invention will be described with reference to FIG. 17.

FIG. 17(A) is a cross-sectional view of an important portion, and FIG. 17(B) is a graph showing the relation between a load and a displacement amount obtained when an impact load is inputted.

This embodiment is similar to the above 18th and 19th embodiment in that an end portion 112b of each fixing portion 102b is fixed through a cover 117, and that the cover 117 serves as a positioning member and an energy absorbing member.

However, the cover 117 has a hook 118 formed at one end close to an anchor fixing portion 1, and a hole 119 is formed through that portion of the fixing portion 102b disposed between a slot 104 and the anchor fixing portion 1.

In this embodiment, when the fixing portion 102b is displaced or moved outwardly upon application of an impact load, the hook 118 is fitted into the hole 119, and will not be disengaged therefrom. Therefore, a rail member 103 will not be restored into its initial condition by a reaction force, and the reaction force of the impact load can be suppressed more efficiently, and the energy-absorbing rate can be enhanced.

Figure 18:
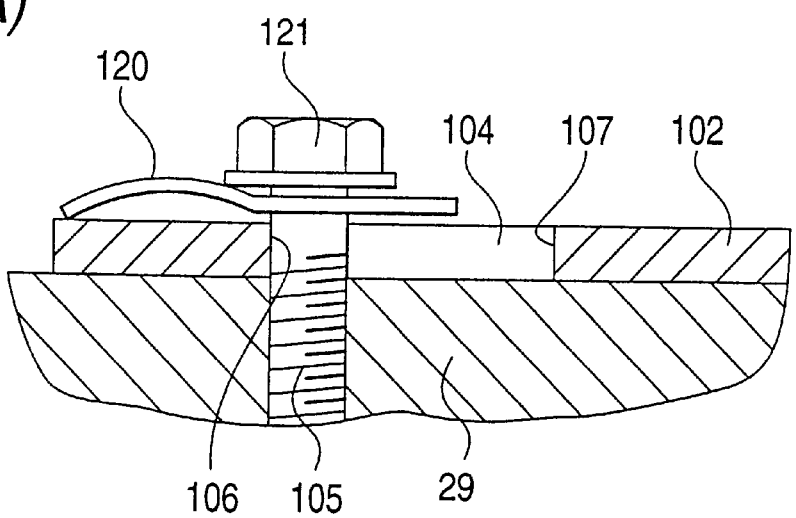
FIG. 18(A) is a cross-sectional view of an important portion of a 21st embodiment in a mounted condition.
FIG. 18(B) is a cross-sectional view of the important portion after application of an impact load.
Figure 18:
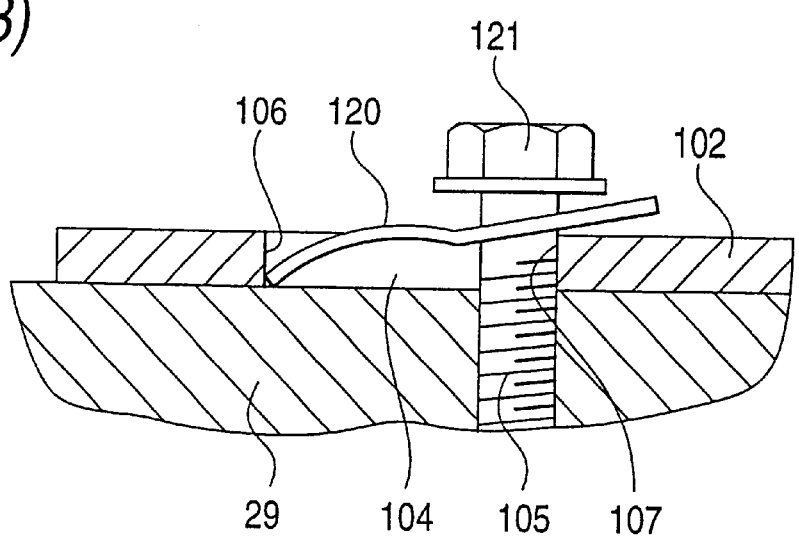

Next, a 21st embodiment of the invention will be described with reference to FIGS. 18(A) and 18(B). FIG. 18(A) is a cross-sectional view of an important portion in a mounted condition, and FIG. 18(B) is a cross-sectional view of the important portion after application of an impact load.

A mounting bolt 105 is fastened through a hook 120 interposed between a fixing portion 102 and a head 121 of the mounting bolt 105, this hook 120 having a resilient force. The hook 120 has a performance related to a fastening torque as in the 16th and 17th embodiments.

With this construction, when the fixing portion 102 is displaced or moved outwardly upon application of an impact load, the hook 120 is fitted into a slot 104 because of its own resiliency and weight, and a distal end of this hook 120 is abutted against an outer end 106 of the slot 104 (see FIG. 18(B)). Therefore, a rail member 103 is completely prevented from being restored into its initial condition by a reaction force.

Next, a 22nd embodiment of the invention will be described with reference to FIG. 19.

Figure 19:
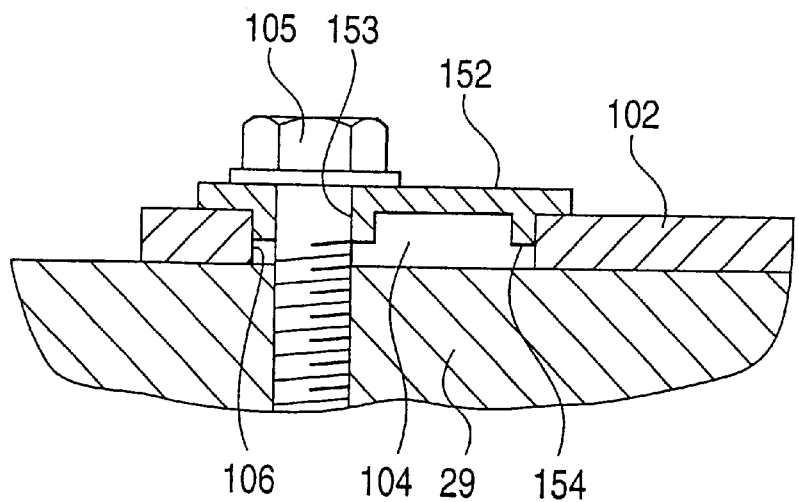
FIG. 19 is a cross-sectional view of an important portion of a 22nd embodiment in a mounted condition.

FIG. 19 is a cross-sectional view of an important portion in a mounted condition. In this embodiment, a mounting bolt 105 is fastened through a spacer 152. The spacer 152 has a through hole 153 through which the mounting bolt 105 extends, and the spacer 152 includes a rib 154 which is engaged with an inner end of a slot 104 (formed through a fixing portion 102) remote from an outer end 106 thereof disposed adjacent to the mounting bolt 105. The spacer 152 is fitted in the slot 104, and its position is fixed. When an impact load greater than a predetermined value is applied, the fixing portion 102 is displaced outwardly, so that the rib 154 is broken, thereby absorbing an impact energy. The rib 154 may be replaced by a boss.

Next, a 23rd embodiment of the invention will be described with reference to FIG. 20. FIG. 20(A) is a partly cross-sectional, side-elevational view of a shoulder anchor device in a mounted condition, and FIG. 20(B) is a partly cross-sectional, side-elevational view after application of an impact load. In the shoulder anchor device of this embodiment, the position of a through anchor 23 is fixed, and there is provided no position adjusting mechanism. An anchor support member 45, having the through anchor 23, is fixedly secured in position to an anchor fixing portion 201 of a rail member 203 by a bolt 46. The construction of mounting the rail member 203 on a center pillar 29, as well as effects thereof, is the same as that of the 14th embodiment of FIG. 12.

In the above embodiments 14 to 23, the slot 104 may be formed through one of the two fixing portions.

Figure 20:
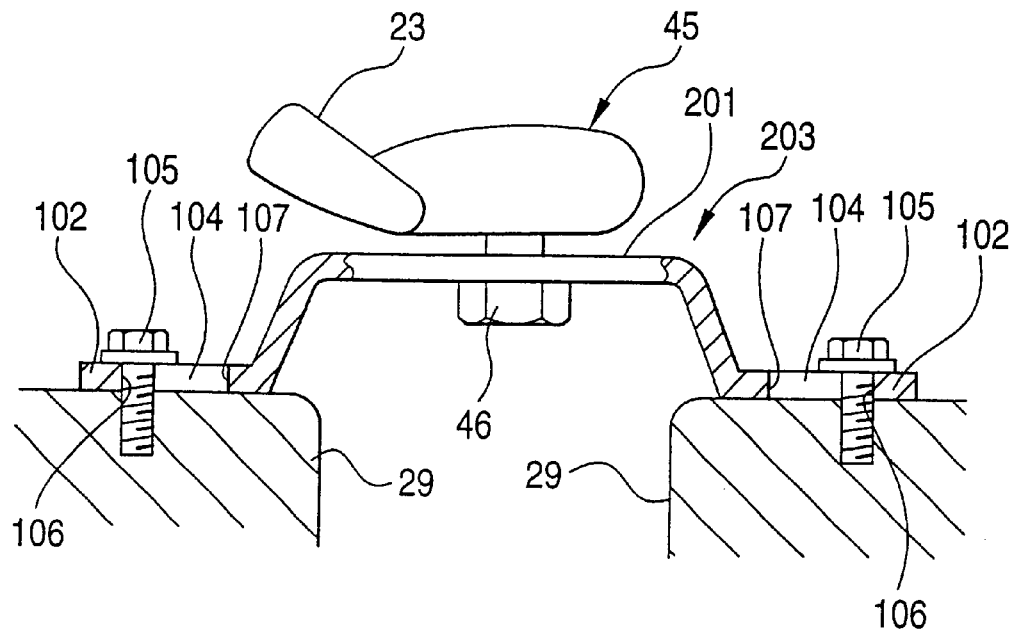
FIG. 20(A) is a partly cross-sectional, side-elevational view of a 23rd embodiment in a mounted condition.
FIG. 20(B) is a partly cross-sectional, side-elevational view after application of an impact load.
Figure 20:
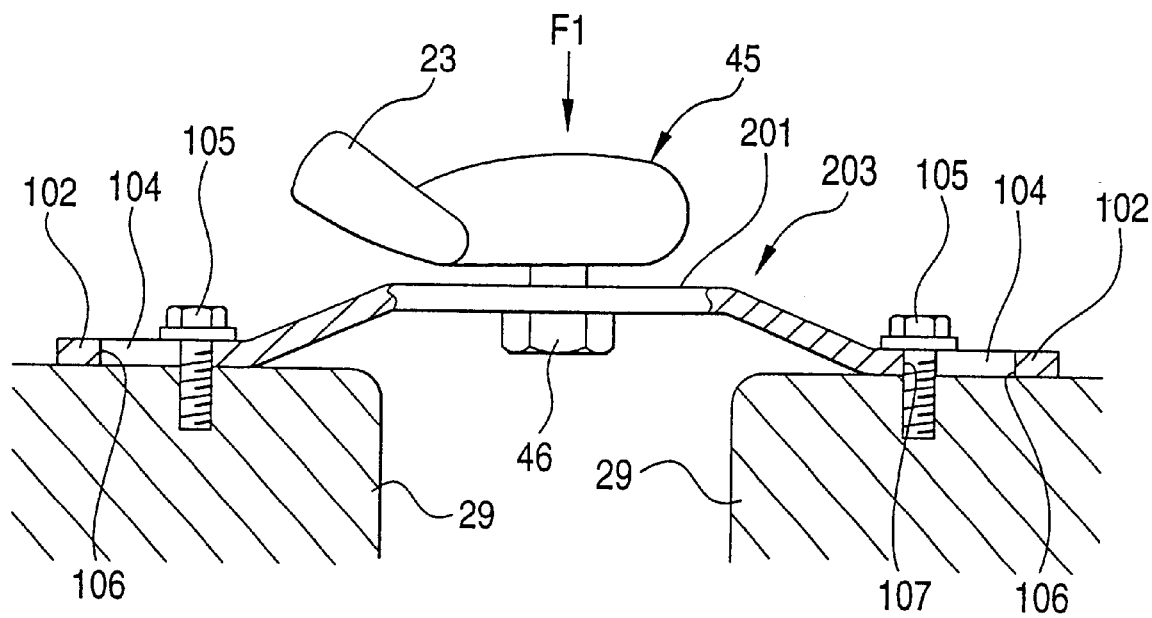
Figure 21:
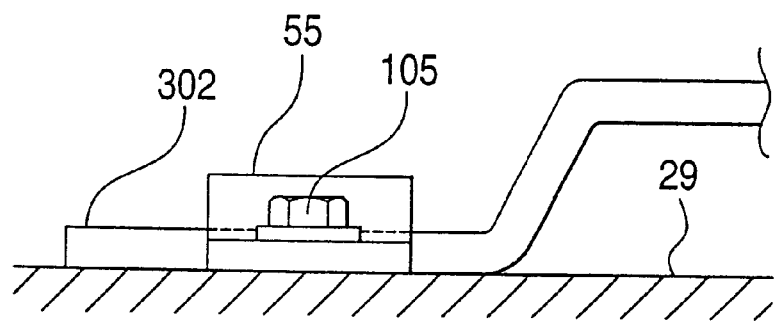
FIGS. 21(A) and 21(B) are fragmentary side-elevational and plan views showing a construction achieving effects similar to those of the present invention.
Figure 21:
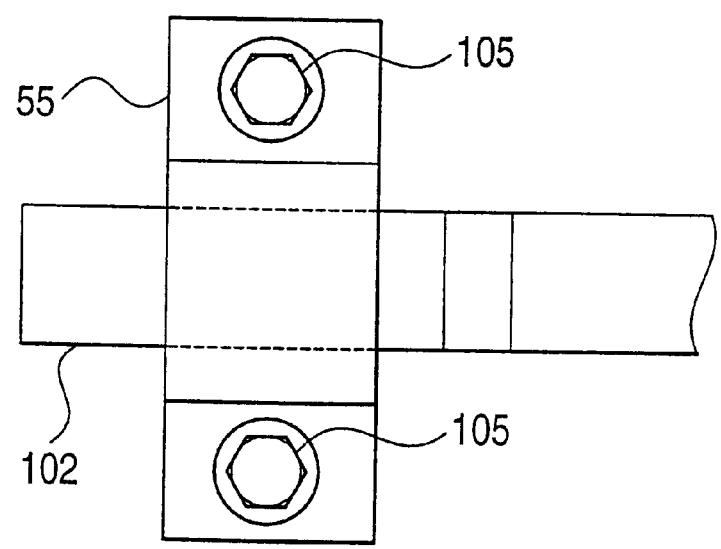
Figure 23:
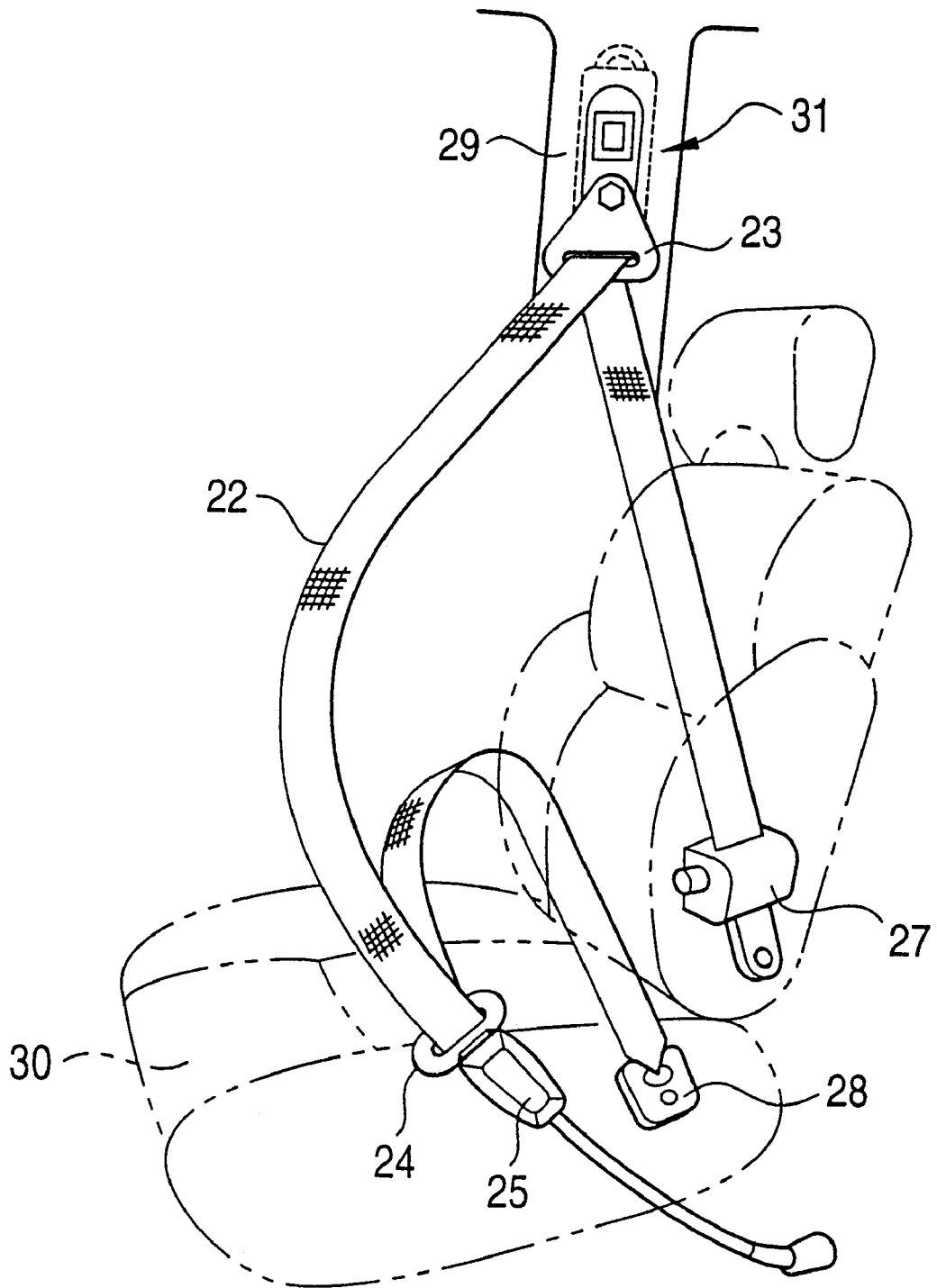
FIG. 23 is a perspective view of a conventional three-point seat belt device using a continuous webbing.

The above construction of FIG. 20 may be replaced by a construction shown in FIG. 21, in which case the impact energy can be absorbed, thereby reducing the reaction force.

In the embodiment shown in FIG. 21, a fixing member 55 of a bridge-like shape is fastened to a center pillar 29 by mounting bolts 105, and a fixing portion 302 is held between the fixing member 55 and the center pillar 29. With this construction, when an impact load greater than a predetermined value is applied, the fixing portion 302, held by the fixing member 55, is displaced outwardly against a frictional force developing between the fixing portion 302 and the fixing member 55, so that the impact energy is absorbed, and the deformation amount is released outwardly, and therefore the reaction force, developing when absorbing the energy, is reduced.

Advantageous Effects of the Invention

As described above, in the present invention, the adjustable base includes the channel-shaped anchor fixing portion, and the cross-sectionally generally flat plate-shaped, fixing portions formed integrally respectively at the opposite ends of the anchor fixing portion, and therefore the anchor fixing portion, even when subjected to a tensile load, exhibits a sufficient strength to withstand this load, and hence is less displaced, thereby enhancing the ability of holding the passenger. When an impact load is applied, the anchor fixing portion is flexed, and also the cross-sectionally flat plate-shaped, fixing portions are buckled, thereby cushioning the impact load. Thus, the present invention provides the adjustable shoulder anchor device which has the two mutually-contradictory abilities.

As described in the above embodiments, there can be provided the adjustable shoulder anchor device in which by suitably determining the size, length, angle of the various portions, the size of the curved portions, and the material, the deformation amount of the various portions, the buckling load thereof, the displacement amount thereof, the position of deformation thereof, the order of deformation of these portions, and the time of deformation thereof can be adjusted, and the desired strength and deformation amount for an impact load and a tensile load can be obtained, and the behavior of the passenger can be controlled. Since the above effects can be obtained only with the adjustable base, a conventional shoulder belt anchor portion can be used in combination with the adjustable base of the invention.

In the present invention, the slot is formed through each of the fixing portions provided respectively at the opposite ends of the rail member, and each mounting bolt is fastened in such a manner that a space or gap is formed between the mounting bolt and the inner end of the slot. Therefore, when the rail member is buckled or flexed and deformed upon application of an impact load, each fixing portion is displaced outwardly, and the mounting bolt moves relative to the associated slot therealong. This eliminates the accumulation of the reaction force energy which would otherwise occur when the two fixing portions act against each other if there is provided no means for releasing the deformation amount. Therefore, the load, corresponding to the maximum deformation, can be reduced, and also the amount of restoration and the reaction force energy after the maximum deformation can be reduced. And besides, all the relevant portions of the rail member can be crushed without fail, and the maximum amount of deformation of the rail member can be obtained. Thanks to these effects, the impact energy-absorbing rate is enhanced, thereby enhancing the safety of the passenger. Each mounting bolt is held in contact with the outer end of the slot to hold the rail member against movement when a tensile load is applied, and therefore the deformation amount is small, and the sufficient strength against a large tensile load is obtained. Therefore, the ability of holding the passenger is enhanced, thereby enhancing the safety of the passenger.

The present application is based on Japanese Patent Applications Nos. Hei. 9-194484 and Hei. 9-219553, which are incorporated herein by reference.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A shoulder anchor device comprising:
   a through anchor for supporting a seat belt;
   a base member for mounting on a center pillar of a vehicle body; and
   a fixing mechanism for fixing said through anchor to said base member;
   wherein said base member is made of a single member and includes,
      a channel-shaped anchor fixing portion of a generally C-shaped cross-section for fixing said through anchor,
      a pair of vehicle fixing portions formed integrally at opposite ends of said anchor fixing portion and formed into a generally flat plate-shape in a cross-section, and
      wherein said vehicle fixing portions are plastically deformed when a predetermined impact force or more is applied to said base member.

2. A device according to claim 1, in which a curved portion is formed at each interconnecting portion of said base member which is interposed between said anchor fixing portion and the associated vehicle fixing portion for interconnecting the same.

3. A device according to claim 1, in which at least one of said vehicle fixing portions comprises:
   a leg portion bent toward the vehicle body relative to said anchor fixing portion; and
   a mounting portion which is bent relative to said leg portion and extends to a distal end of said base member.

4. A device according to claim 3, in which said vehicle fixing portion has an extension portion extending between said leg portion and said anchor fixing portion.

5. A device according to claim 4, in which each of said vehicle fixing portions has said leg portion and said extension portion.

6. A device according to claim 5, in which one of said extension portions is different in length from the other.

7. A device according to claim 5, in which a bending angle defined between said extension portion and said leg portion of one of said vehicle fixing portions is different from a bending angle defined between said extension portion and said leg portion of the other vehicle fixing portion.

8. A device according to claim 5, in which said leg portion of one of said vehicle fixing portions is different in length from said leg portion of the other vehicle fixing portion.

9. A device according to claim 4, in which said extension portion and a bottom plate portion of said anchor fixing portion are disposed in a common plane in continuous relation to each other.

10. A device according to claim 3, in which a slot for receiving a mounting bolt is formed through said mounting portion, and a space is formed between one end of said slot, disposed close to said anchor fixing portion, and said mounting bolt.

11. A device according to claim 1, in which said pair of vehicle fixing portions and a bottom plate portion of said anchor fixing portion are disposed in a common plane in continuous relation to one another.

12. A device according to claim 1, in which a through hole for passing a mounting bolt therethrough is formed through each of said vehicle fixing portions.

13. A device according to claim 1, in which one of said two vehicle fixing portions is formed into a hook-like shape, and is engageable in an engagement portion of the center pillar.

14. A device according to claim 1, in which at least one of said vehicle fixing portions has a plurality of mounting portions, and said base member is mounted on the center pillar through said plurality of mounting portions.

15. A device according to claim 1, in which at least one of said vehicle fixing portions has a portion which is bent into a generally Z-shape in a cross-section.

16. A device according to claim 1, in which at least one of said vehicle fixing portions has a portion which is outwardly bent into a recumbent V-shape in a cross-section.

17. A device according to claim 1, in which each of said vehicle fixing portions has a leg portion, bent relative to said anchor fixing portion toward the vehicle body, and a mounting portion which is bent relative to said leg portion, and extends to a distal end of said base member.

18. A device according to claim 17, in which a bending angle between said anchor fixing portion and said leg portion of one of said vehicle fixing portions is different from a bending angle between said anchor fixing portion and said leg portion of the other vehicle fixing portion.

19. A device according to claim 17, in which a length said leg portion of one of said vehicle fixing portions is different from that of said leg portion of the other vehicle fixing portion.

20. A device according to claim 17, in which a through hole for passing a mounting bolt therethrough is formed through each of said mounting portions.

21. A device according to claim 1, wherein said base member which includes the channel-shaped anchor fixing portion is made from a single flat-plate which has been bent.

22. A shoulder anchor device comprising:
a through anchor for supporting a seat belt;
a base member for mounting on a center pillar of a vehicle body; and
a fixing mechanism for fixing said through anchor to said base member;
wherein said base member is made of a single member and includes an anchor fixing portion for fixing said through anchor, and two vehicle fixing portions formed integrally respectively at opposite ends of said anchor fixing portion;
wherein at least one of said vehicle fixing portions includes a mounting portion for mounting on the vehicle body, and an interconnecting portion interconnecting said mounting portion and said anchor fixing portion in such a manner that said anchor fixing portion is disposed inwardly of said mounting portion relative to a vehicle room; and
wherein a slot for receiving a mounting bolt is formed through said mounting portion, and extends in a direction of a length of said base member, and a space is formed between one end of said slot, disposed close to said anchor fixing portion, and said mounting bolts,
wherein said two vehicle fixing portions are plastically deformed when a predetermined impact force or more is applied to said base member.

23. A device according to claim 22, wherein said base member which includes the anchor fixing portion is made from a single flat-plate which has been bent.

24. A device according to claim 22, in which at least one of said vehicle fixing portions has a leg portion, which is bent toward the vehicle body relative to said anchor fixing portion, and the mounting portion which is bent relative to said leg portion, and extends to a distal end of said base member.

25. A device according to claim 22, in which a central portion of said slot in a direction of a length thereof is constricted.

26. A device according to claim 22, in which a wavy washer is provided between said mounting bolt and said vehicle fixing portion.

27. A device according to claim 22, in which a spacer is provided between said mounting bolt and said vehicle fixing portion.

28. A device according to claim 27, in which said spacer has a through hole for passing said mounting bolt therethrough, and an engagement portion engaged with one end of said slot close to said anchor fixing portion.

29. A device according to claim 22, further comprising:
a cover having a through hole for passing said mounting bolt therethrough, said cover having a deformable portion which is deformed by said vehicle fixing portion when said vehicle fixing portion is moved relative to said mounting bolt through said slot.

30. A device according to claim 29, in which a slit is formed in said cover, and extends from that portion of said through hole, disposed close to said anchor fixing portion, in the direction of the length of said base member.

31. A device according to claim 29, in which said cover has a hook which is engaged with said vehicle fixing portion when said deformable portion is deformed.

32. A device according to claim 22, in which a hook is provided between said mounting bolt and said vehicle fixing portion, and when said vehicle fixing portion is moved relative to said mounting bolt through said slot, said hook is brought into a position between one end of said slot remote from said anchor fixing portion and said mounting bolt.

* * * * *